US008549247B2

(12) United States Patent
Satoyama et al.

(10) Patent No.: US 8,549,247 B2
(45) Date of Patent: Oct. 1, 2013

(54) STORAGE SYSTEM, MANAGEMENT METHOD OF THE STORAGE SYSTEM, AND PROGRAM

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 13/054,933

(22) PCT Filed: Dec. 28, 2010

(86) PCT No.: PCT/JP2010/007583
§ 371 (c)(1), (2), (4) Date: Jan. 19, 2011

(87) PCT Pub. No.: WO2012/090247
PCT Pub. Date: Jul. 5, 2012

(65) Prior Publication Data
US 2012/0166748 A1    Jun. 28, 2012

(51) Int. Cl.
*G06F 12/00*    (2006.01)

(52) U.S. Cl.
USPC ............................ 711/165; 711/114

(58) Field of Classification Search
USPC ................................ 711/114, 165
See application file for complete search history.

(56) References Cited

U.S. PATENT DOCUMENTS

| 6,857,059 | B2 | 2/2005 | Karpoff et al. |
| 2005/0055603 | A1 | 3/2005 | Soran et al. |
| 2006/0277386 | A1 | 12/2006 | Eguchi |
| 2008/0235448 | A1 | 9/2008 | Inoue et al. |
| 2009/0043942 | A1 | 2/2009 | Shiga |
| 2009/0043982 | A1 | 2/2009 | Kano et al. |
| 2010/0115222 | A1 | 5/2010 | Usami |
| 2011/0258379 | A1* | 10/2011 | Hayashi ................. 711/114 |
| 2011/0264855 | A1* | 10/2011 | Kasako .................. 711/114 |
| 2012/0042124 | A1* | 2/2012 | Miyamoto et al. ....... 711/114 |
| 2012/0131302 | A1* | 5/2012 | Nasu et al. ............. 711/171 |
| 2012/0151169 | A1* | 6/2012 | Mori et al. ............. 711/166 |
| 2012/0151174 | A1* | 6/2012 | Matsunaga et al. ...... 711/171 |
| 2012/0159112 | A1* | 6/2012 | Tokusho et al. ......... 711/171 |
| 2012/0198151 | A1* | 8/2012 | Kato et al. .............. 711/114 |

FOREIGN PATENT DOCUMENTS

| JP | 2003-015915 | 1/2003 |
| JP | 2006-338341 | 12/2006 |
| JP | 2008-234158 | 10/2008 |

OTHER PUBLICATIONS

White Paper on Fast and Virtual LUN for Oracle Database and EMC Symmetrix V-Max with Enginuity 5874—Applied Technology; Apr. 2010; pp. 1-34; EMC Corporation.
PCT International Search Report on application No. PCT/JP2010/007583 mailed Jul. 26, 2011; 5 pages.

* cited by examiner

*Primary Examiner* — John Lane
(74) *Attorney, Agent, or Firm* — Foley & Lardner LLP

(57) ABSTRACT

Provided is a technique for realizing allocation of pool areas to virtual volumes in accordance with the use environment of the user with proper cost, while improving the capacity efficiency of media. For this purpose, in the present invention, a pool is constituted by selecting or limiting combinations of tiers of media in the pool to be used (range of tiers that can be used in each pool) for each virtual volume set in a storage system (see FIG. 5).

19 Claims, 26 Drawing Sheets

| Tier# | Storage location | Type of medium | The number of rotations | RAID level |
|---|---|---|---|---|
| 0 | Inside | SSD | | |
| 1 | Inside | SAS, | 10K | RAID1 |
| 2 | Inside | SAS | 10K | RAID5 |
| 3 | Inside | SATA | | RAID5 |
| 4 | External AMS2500 | SAS | | RAID5 |
| 5 | External AMS2100 | SAS | | RAID5 |
| 902 | 904 | 906 | 908 | 910 |

| Tier# | Type of medium |
|---|---|
| 0 | SSD |
| 1 | SAS |
| 2 | SATA |
| 902 | 906 |

| LANE# | Combination of Tiers |
|---|---|
| 0 | Tier0 |
| 1 | Tier1 |
| 2 | Tier2 |
| 3 | Tier0, Tier1 |
| 4 | Tier1, Tier2 |
| 5 | Tier0, Tier1, Tier2 |

STORAGE SYSTEM, MANAGEMENT METHOD OF THE STORAGE SYSTEM, AND PROGRAM

TECHNICAL FIELD

The present invention relates to a storage system, a management method of the storage system, and a program, and for example, relates to control of a storage system that dynamically allocates a storage capacity to a host apparatus.

BACKGROUND ART

Conventionally, there is a computer system that provides a large-scale data storage service to a host apparatus. The system is known as a system comprising a host apparatus, a storage apparatus (also called a storage system) connected by the host apparatus, and a management apparatus of the storage apparatus.

The storage apparatus manages a plurality of hard disks by a RAID (Redundancy Array of Independent/Inexpensive Disks) system. Physical storage areas included in a multiplicity of hard disks are made logical, and the areas are provided to the host apparatus as logical volumes. The host apparatus accesses the logical volumes to request reading/writing of data.

An example of the logical technique includes so-called thin provisioning (Thin Provisioning). Physical storage areas are not included in the thin provisioning, and logical volumes with virtualized storage capacity are set to the host apparatus. The logical volumes are called virtual volumes, and the storage apparatus sequentially allocates the storage areas to the virtual volumes in accordance with the write access to the virtual volumes by the host apparatus. Therefore, the technique is advantageous in that the storage resources can be effectively used, compared to a system of allocating large-capacity storage areas to the logical volumes from the beginning.

The thin provisioning is described, for example, in Patent Literature 1 to 4. In the thin provisioning, a section which provides the storage areas to the virtual volumes is configured to store write data by allocating the storage capacity from a capacity pool including real storage areas to addresses of the virtual volumes when there is a write access from the host apparatus to the virtual volumes. The "capacity pool" (also simply called "pool") is defined and set by, for example, compiling a plurality of logical groups with real capacity to be used for writing in the virtual volumes, and the plurality of logical volumes belonging to the pool are called pool volumes.

Patent Literature 5 discloses a technique, in which whether the access frequency to stored data is high or low is determined, and if the access frequency is high, the data is moved, within the pool, to a pool volume including a medium suitable for high-speed processing based on physical characteristic information (such as the type of medium and the number of rotations of the disk) of media of the pool volumes.

CITATION LIST

Patent Literature

PTL 1: U.S. Pat. No. 6,857,059
PTL 2: JP Patent Publication (Kokai) No. 2003-015915A
PTL 3: JP Patent Publication (Kokai) No. 2006-338341A
PTL 4: JP Patent Publication (Kokai) No. 2008-234158A
PTL 5: U.S. Publication No. US2005/055603

SUMMARY OF INVENTION

Technical Problem

The conventional techniques disclose a method of migration to a storage area of a medium suitable for high-speed processing based on the physical characteristic information of media of the pool volumes if the access frequency is high.

However, there are cases that the data needs to be placed in a high-performance medium even if the access frequency is low. In these cases, there is a problem in the conventional techniques that the data is migrated to a low-performance medium after first storing the data in a high-performance medium, as a result of monitoring the access frequency.

Furthermore, there are cases that the media allocated to the virtual volumes need to be classified based on the performance requirements (such as response time and I/O speed) necessary for the application. In these cases, divided pools are formed for each medium, and media to be used need to be classified application by application in the conventional techniques. However, if the pools are divided, there is a situation in which there are variations in the used capacities even if there is a room in the capacities in the media as a whole, and the virtual volumes cannot be allocated. There is a problem that the capacity efficiency is degraded.

Furthermore, in the conventional techniques, when the media used by the virtual volumes are changed after the change in the performance requirements of the application, there is a problem that mapping of the virtual volumes and the used pools needs to be set again.

Furthermore, according to the conventional techniques, when a single pool is used for a plurality of virtual volumes, any virtual volume can be allocated to the storage capacities of all media in the pool. Therefore, there is a problem that the storage areas of media suitable for high-speed processing of the pool volumes are allocated to the virtual volumes with high performance requirements and to the virtual volumes with low performance requirements in the same way. The cost of the areas of the high-performance media are usually high, and the capacity is limited. Therefore, there is a need to allocate the areas of the pool to the virtual volumes with really high performance requirements.

The present invention has been made in view of the situations, and the present invention provides a technique for realizing the allocation of pool areas to virtual volumes in accordance with the use environment of the user with proper cost, while improving the capacity efficiency of media.

Solution to Problem

To solve the problems, in the present invention, a pool is constituted by selecting or limiting combinations of tiers of media in the pool to be used (range of tiers that can be used in each pool) for each virtual volume set in the storage system (storage apparatus). The storage system manages information indicating that storage areas are assigned from which tiers of storage devices in the pool, to virtual volumes receiving I/O requests from a host computer.

More specifically, in the storage system according to the present invention, at least one pool is provided that contains a plurality of storage areas assigned from a plurality of storage devices. The attributes of the plurality of storage devices are different from each other. A processor in the storage system, responsive to a write request from an upper level computer (a host computer) to a virtual volume in which at least one storage area is assigned, acquires a storage area included in the pool and stores target data in the acquired storage area. Further, the plurality of storage devices each which has a different attribute are composed of a plurality of Tiers. The processor sets up to the virtual volume one or more Tiers used for assigning the storage areas in response to a tier setting instruction to be input.

Advantageous Effects of Invention

According to the present invention, pool areas can be allocated to virtual volumes in accordance with the use environment of the user with proper cost, while improving the capacity efficiency of media.

Other problems, configurations, and effects will become apparent from the following Description of Embodiments and the attached drawings.

DESCRIPTION OF EMBODIMENTS

Figure 1:
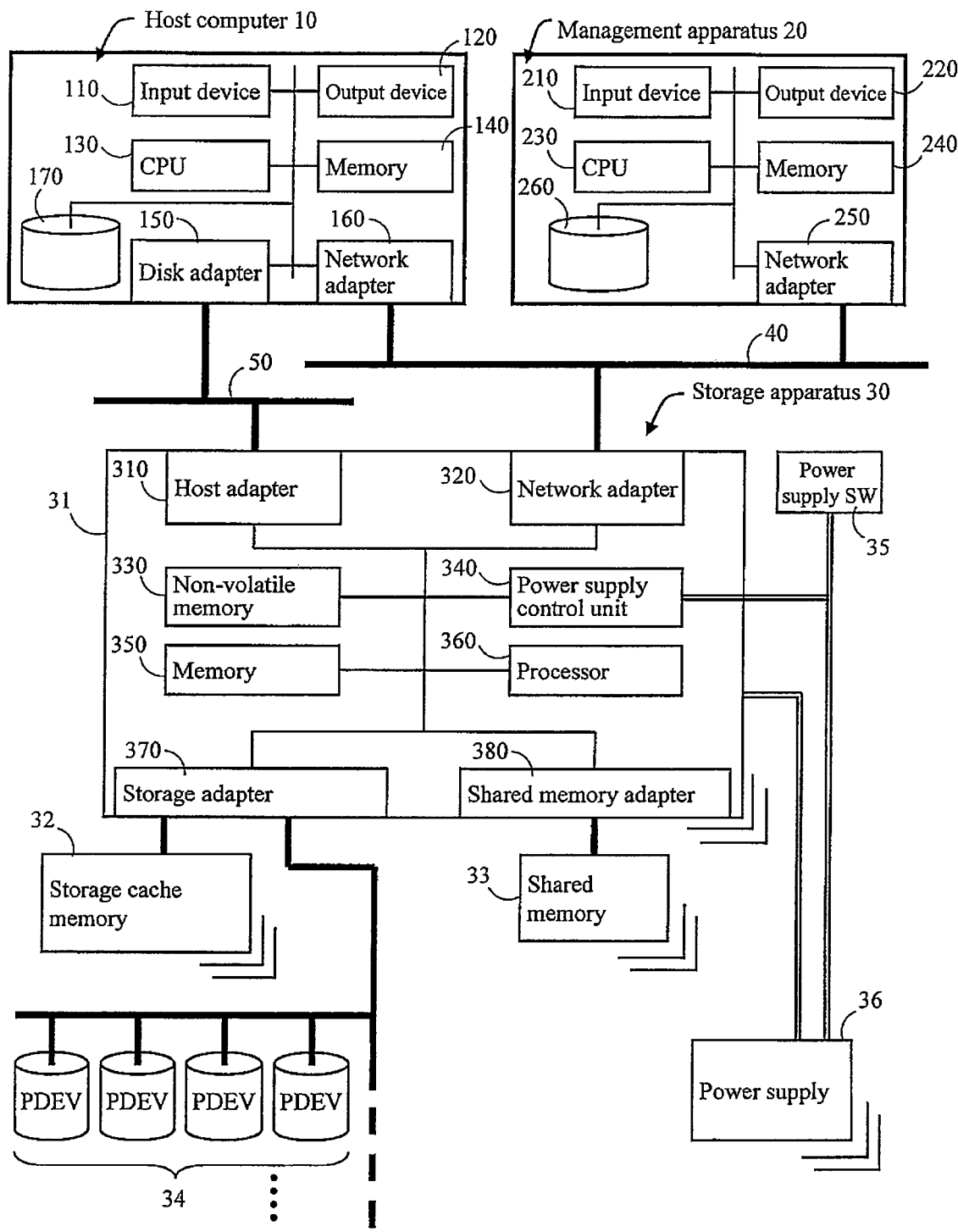
FIG. 1 is a diagram showing a basic configuration of a computer system according to the present invention.

Hereinafter, embodiments of the present invention will be described with reference to the attached drawings. However, it should be noted that the present embodiments are just examples for realizing the present invention and that the present embodiments do not limit the technical scope of the present invention. Common configurations in the drawings are designated with the same reference numerals.

Although the information of the present invention will be expressed as a "table" in the following description, the information does not have to be expressed by a data structure of a table, and the information may be expressed by a data structure of a list, a DB, a queue, and the like or by other structures. Therefore, "table", "list", "DB", "queue", and the like can also be simply called "information" to show the independence from the data structure.

Expressions, such as "identification information", "identifier", "forename", "name", and "ID", can be used to describe the content of the information, and the expressions can replace each other.

Although a "program" serves as a subject in the following description, the program is executed by a processor to carry out a provided process while using a memory and a communication port (communication control apparatus). Therefore, the processor may serve as the subject in the description. A computer, such as a management server, or an information processing apparatus may execute the disclosed processes in which programs are designed to serve as subjects. Part or all of the programs may be realized by dedicated hardware, or the programs may be formed into modules. Various programs may be installed in computers by a program distribution server or storage media.

<Configuration of Computer System>
(Basic Configuration)

FIG. 1 is a hardware block diagram showing a basic configuration of a computer system according to the present invention. The computer system comprises at least one host computer 10, at least one management apparatus (management computer) 20, and at least one storage apparatus 30 connected with the host computer 10 and the management apparatus 20. The storage apparatus 30 may be called a storage system or a storage subsystem.

The host computer 10 accesses logical storage resources of the storage apparatus 30. The management apparatus 20 manages the configuration of storage areas of the storage apparatus 30. The storage apparatus 30 stores data in a storage area set to a physical device 34.

The host computer 10 comprises an input section 110, an output section 120, a CPU 130, a memory 140, a disk adapter 150, a network adapter 160, and a disk driver 170.

The input device 110 is a section which receives input from a manager or the like who operates the host computer 10 and is constituted by, for example, a keyboard and a mouse. The output device 120 is a section which displays the state or setting items of the host computer 10 and is constituted by, for example, a display device and a printer.

The CPU 130 (controller, processor) loads a program stored in the disk driver 170 on the memory 140 to execute the process defined in the program. The memory 140 is constituted by, for example, a RAM, and stores programs, data, and the like.

The disk adapter 150 connects to the storage apparatus 30 through a storage area network 50 and transmits and receives data to and from the storage apparatus 30. The storage area network 50 realizes data transfer based on a protocol (such as Fibre Channel) suitable for the data transfer.

The network adapter 160 transmits and receives data to and from the management apparatus 20 or the storage apparatus 30 through a management network 40. The management network 40 is constituted by, for example, Ethernet (registered trademark). The disk drive 170 is constituted by, for example, a hard disk drive and stores data and programs.

The management apparatus 20 comprises an input device 210, an output device 220, a CPU 230, a memory 240, a network adapter 250, and a disk drive 260.

The input section 210 is a section which receives input of a manager or the like who operates the management apparatus 20 and is constituted by, for example, a keyboard. The output section 220 is a section which displays the state and setting items of the management apparatus 20 and is constituted by, for example, a display device.

The CPU 230 loads a management program stored in the disk drive 260 on the memory 240 and executes a management process for the storage apparatus 30 based on the program. The memory 240 is constituted by, for example, a RAM and stores programs, data, and the like.

The network adapter 250 transmits and receives data to and from the host computer 10 or the storage apparatus 30 through the management network 40. The disk drive 260 is constituted by, for example, a hard disk drive and stores data and programs.

The storage apparatus 30 comprises a controller 31, at least one storage cache memory 32, at least one shared memory 33, the physical device (PDEV) 34, a power supply switch 35, and at least one power supply 36. The controller 31 controls storage of data to storage areas included in the PDEV 34. The storage cache memory 32 temporarily stores data read and written to and from the PDEV 34. The shared memory 33 stores configuration information of the controller 31 and the PDEV 34. The PDEV 34 comprises a plurality of disk drives. The power supply 36 supplies power to the components of the storage apparatus 30. The power supply switch 35 is a switch for turning ON/OFF the supply of power from the power supply 36. The disk drive (storage device) is constituted by, for example, a hard disk drive and mainly stores user data. The storage device may be a drive made of a semiconductor memory such as a flash memory.

The controller 31 at least comprises a processor 360, and in the embodiments, further comprises a host adapter 310, a network adapter 320, a non-volatile memory 330, a power supply control unit 340, a memory 350, a storage adapter 370, and a shared memory adapter 380.

The host adapter 310 transmits and receives data to and from the host computer 10 through the storage network 50. The network adapter 320 transmits and receives data necessary for system management (management information) to and from the host computer 10 or the management apparatus 20 through the management network 40.

The non-volatile memory 330 is constituted by a hard disk or a flash memory and stores programs operated on the controller 31, configuration information, and the like. The power supply control unit 340 controls power supplied from the power supply 36.

The memory 350 is constituted by, for example, a RAM and stores programs, data, and the like. The processor 360 loads a program stored in the non-volatile memory 330 on the memory 350 to execute a process defined by the program.

The storage adapter 370 transmits and receives data to and from the PDEV 34 and the storage cache memory 32. The shared memory adapter 380 transmits and receives data to and from the shared memory 33.

Modified Example 1

Figure 2:
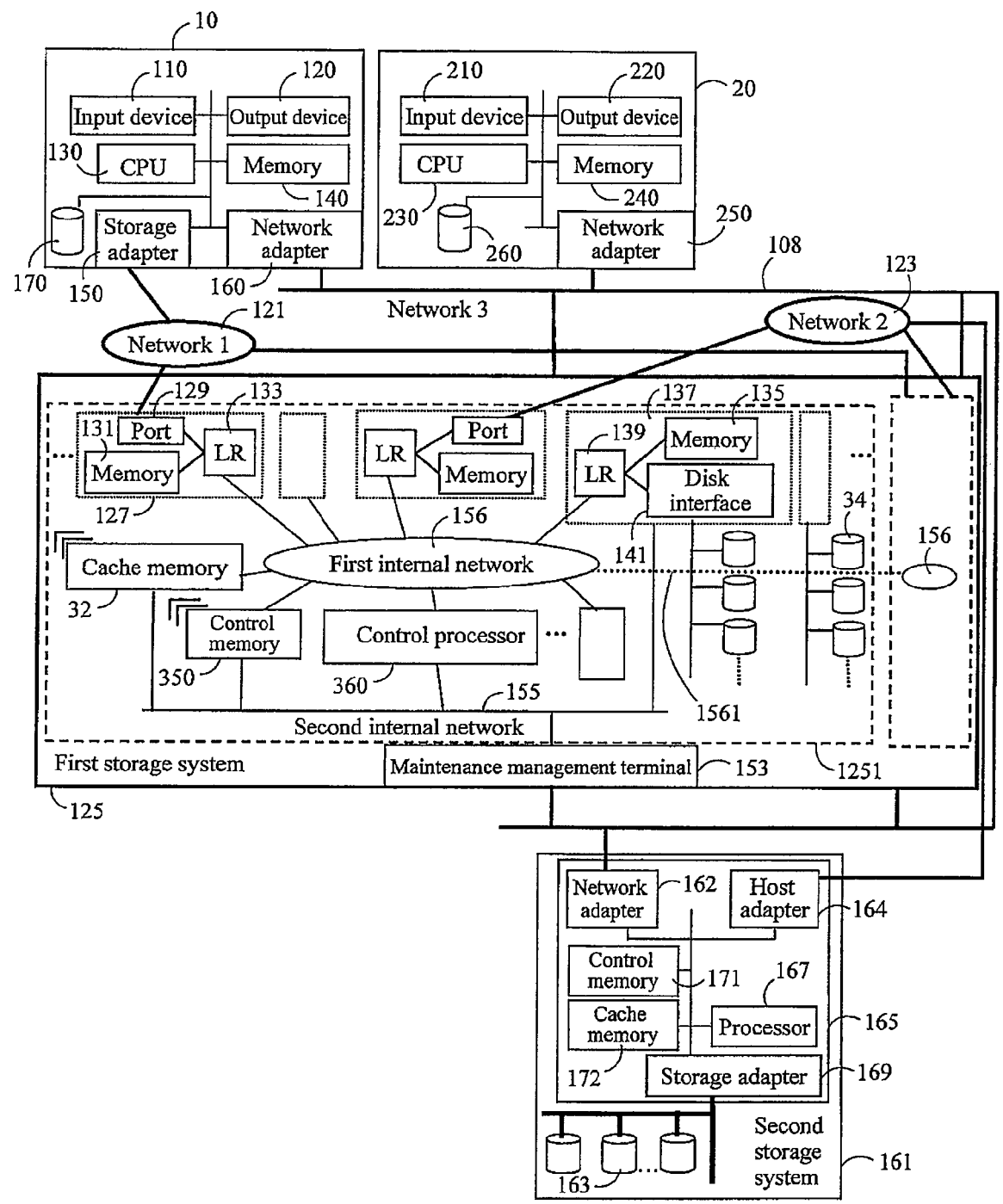
FIG. 2 is a diagram showing a configuration of a modified example 1 of the computer system applicable to the present invention.

FIG. 2 is a hardware block diagram showing a configuration of a modified example of the computer system of FIG. 1. The computer system comprises one or more host computers 10, the management host computer 20, a first storage apparatus 125, and a second storage apparatus 161.

The first storage apparatus 125 is connected to the host computer 10 through a first network 121. The second storage apparatus 161 is connected to a first storage system 30A through a second network 123. One or more host computers 10, the management host computer 20, the first storage apparatus 125, and the second storage apparatus 161 are connected to each other through a third network 108.

The first network 121, the second network 123, and the third network 108 may be any types of networks. For example, SAN can be used as the first network 121 and the second network 123, and LAN can be used as the third network 108.

The first storage apparatus 125 comprises a controller and the storage device group 34. The controller comprises, for example, a plurality of front-end interfaces 127, a plurality of back-end interfaces 137, a first internal network 156, one or more cache memories 32, one or more control memories 350, and one or more control processors 360.

The front-end interfaces 127 are interface circuits for communication with the host computer 10 or the second storage apparatus 161 connected to the first storage apparatus 125 through the network 121. Therefore, the first storage apparatus 125 includes at least two front-end interfaces 127, and one of the front-end interfaces 127 is connected to the first network 121, and another front-end interface 127 is connected to the second network 123.

The front-end interface 127 comprises, for example, a port 129 connected to the first network 121 or the second network 123, a memory 131, and a local router (hereinafter abbreviated "LR") 133. The port 129 and the memory 131 are connected to the LR 133.

The LR 133 distributes data received through the port 129 for processing by an arbitrary control processor 360. Specifically, for example, the control processor 360 sets the LR 133 to cause the control processor 360 to execute an I/O command designating an address. The LR 133 distributes the I/O command and data according to the setting.

There are also a plurality of back-end interfaces 137. The back-end interfaces 137 are interface circuits for communication with the PDEVs 34. The back-end interface 137 comprises, for example, a disk interface 141 connected to the PDEV 34, a memory 135, and an LR 139. The disk interface 141 and the memory 135 are connected to the LR 139.

The first internal network 156 is constituted by, for example, a switch or a bus. The plurality of front-end interfaces 127, the plurality of back-end interfaces 137, one or more cache memories 32, one or more control memories 350, and one or more control processors 143 are connected to the first internal network 156. Communications between the elements are performed through the first internal network 156.

A second internal network (for example, LAN) 155 is connected to the front-end interfaces 127, the back-end interfaces 137, the cache memory 32, the control memory 350, and the control processor 360 that are constituent elements of the controller, and a maintenance management terminal 153 is connected to the second internal network 155.

The maintenance management terminal 153 is also connected to the third network 108 and is a computer that maintains or manages the first storage apparatus 125. The maintenance personnel of the first storage apparatus 125 can, for example, operate the maintenance management terminal 153 (or the management apparatus 20 capable of communicating with the maintenance management terminal 153) to define various pieces of information stored in the control memory 350.

The second storage apparatus 161 includes a controller 165 and a PDEV 163. The controller 165 includes, for example, a network adapter 162, a host adapter 164, a cache memory 172, a control memory 171, a processor 167, and a storage adapter 169.

The network adapter 162 is connected to the third network 108 and is an interface for communication with the management computer 20. Management information necessary for the system management is transmitted and received between the management computer 20 and the host computer 10 and between the management computer 20 and the second storage apparatus 161 through the third network. The host adapter 164 is connected to the second network 123 and is an interface for communicating with the first storage apparatus 125. The host adapter 164 may be similar to, for example, the front-end interface 127 of the first storage apparatus 125.

The control memory 171 is a memory that stores various computer programs and information. The cache memory 172 is a memory that temporarily stores data read or written according to an I/O command from the first storage apparatus 125.

The processor 167 executes various computer programs stored in the control memory 171. The processor 167 controls at least writing and reading of data to and from the cache memory 172 and the PDEV 163 in accordance with an I/O command from the first storage apparatus 125.

The PDEV 163 is a physical storage device and may be similar to, for example, the PDEV 34 of the first storage apparatus. The PDEV 163 may also be a tape storage medium.

The first storage apparatus 125 comprises a so-called external connection function. The second storage apparatus 161 is externally connected to the first storage apparatus 125 based on the function. The external connection will be described here.

As described, the first storage apparatus 125 provides one or a plurality of logical volumes to the host computer 10. Each logical volume is recognized as one storage device by the host computer 10. For example, the logical volume provided by the first storage apparatus 125 may be associated with the PDEV 34 in the first storage apparatus 125. In that case, when a write command to the logical volume is received, the first storage apparatus 125 stores data to the PDEV 34 associated with the logical volume. Such a logical volume will also be described as a normal volume in the following description.

Alternatively, the logical volume provided by the first storage apparatus 125 may be associated with the PDEV 163 in the second storage apparatus 161. In that case, when a write command to the logical volume is received, the first storage apparatus 125 generates a write command for writing data to the PDEV 163 associated with the logical volume and transmits the generated write command to the second storage apparatus 161. The second storage apparatus 161 stores the data in the PDEV 163 in accordance with the write command received from the first storage apparatus 125.

The function of storing the data stored in the logical volume provided by the first storage apparatus 125 in the second storage apparatus 161 that is actually connected outside the first storage apparatus 125 is called an external connection function.

The first storage apparatus 125 comprises a plurality of modules (clusters) 1251 that establish a storage control process. Each module includes the internal network 156, and a plurality of module internal networks 156 are connected by a network 1561 between the modules. Therefore, the control processor 360 of one module can access other modules. For example, the control processor 360 can read and write data of the cache memories 32 of other modules. The network 1561 between the plurality of modules is constituted by paths and switches.

Modified Example 2

Figure 3:
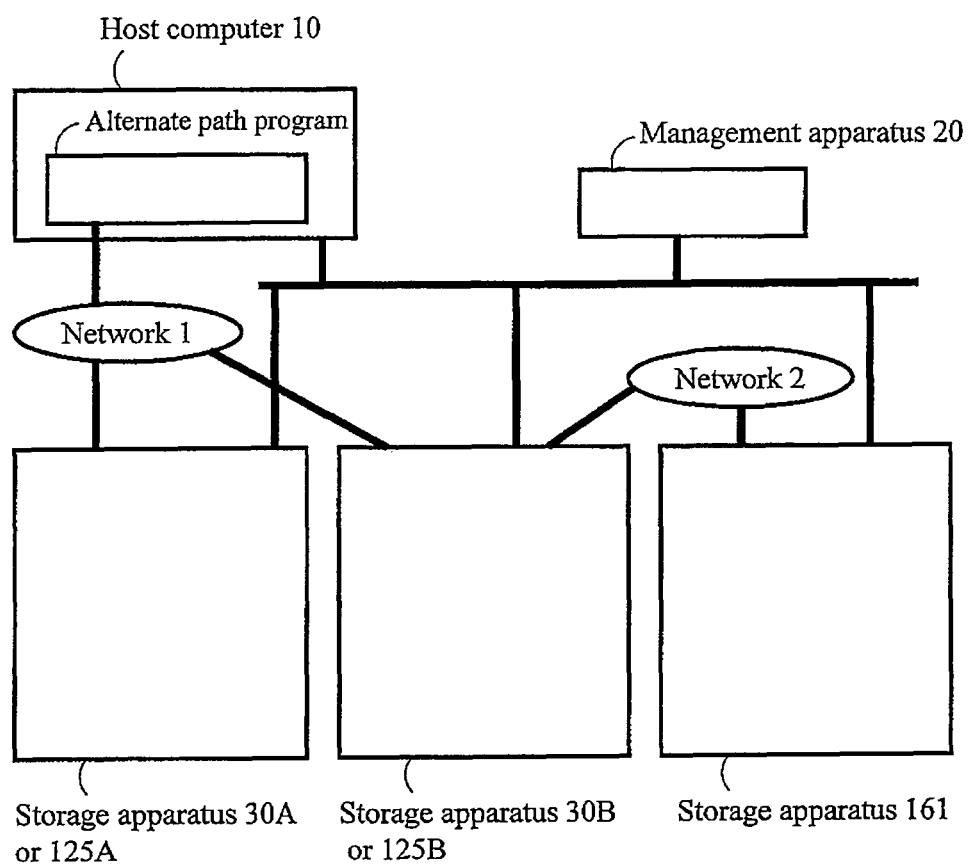
FIG. 3 is a diagram showing a configuration of a modified example 2 of the computer system applicable to the present invention.

FIG. 3 is a hardware block diagram showing a configuration of a computer system connected with a plurality of storage apparatuses shown in FIGS. 1 and 2.

A plurality of storage apparatuses 30 (FIG. 1) or 125 (FIG. 2) are connected in the computer system, and each is connected to the host computer 10 and the management apparatus 20. The storage apparatus 161 is connected to a storage apparatus 30B or 125B. Although the storage apparatus 161 is connected to the storage apparatus 30B or 125B in the present example, a different storage apparatus 161 or the same storage apparatus 161 may be connected to the first storage apparatus 30A or 125A. The host computer 10 uses an alternate path program to use two storage apparatuses 125A or 30A and 30B or 135B as one storage system.

The memory 140 of the host computer 10 stores a path management table (not shown), the alternate path program, and a plurality of application programs (not shown). A plurality of paths associated with one logical volume by the path management table may be paths to logical units of different storage apparatuses. More specifically, the host computer 10 sets the storage apparatus 125 or 30 as an alternate path of the same logical volume. The logical units can return the same response to an inquiry by an Inquiry command defined by the SCSI standard to provide the response to a plurality of application programs.

<Example of Internal Configuration of Storage Apparatus>

Figure 4:
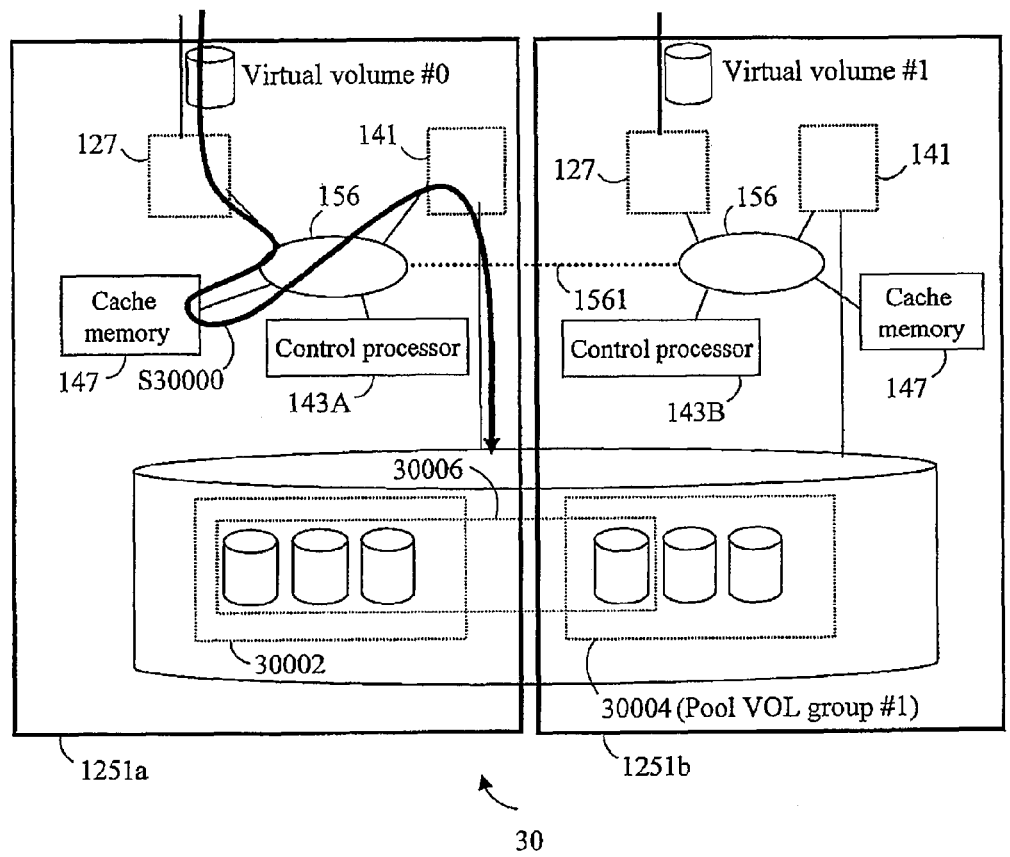
FIG. 4 is a diagram showing a configuration in which a storage apparatus shown in FIG. 2 includes a plurality of modules (clusters).

FIG. 4 is a hardware block diagram showing a configuration in which the storage apparatus shown in FIG. 2 includes a plurality of modules. A first module 1251*a* controls an access process to a first virtual volume (VOL#0), and a second module 1251*b* controls an access process to a second virtual volume (VOL#1).

A pool 30004 shown in FIG. 4 may be formed across a plurality of modules. However, depending on the device configuration of the network 1561, the transfer speed may drop, and the performance may be degraded if the transfer is through the network 1561. To prevent this, the system selects pool volumes that do not pass through the network 1561 when pool volumes are allocated to the virtual volumes (VOL#0). Therefore, the storage apparatus 30 manages the pools module by module. Pool volume groups #0 (30002), #1 (30004), and #2 (30006) show an example of the management.

When the storage apparatus 30 allocates pages to the virtual volume #0 set in the module 1251*a*, the pool volumes of the pool group #0 (30002) are selected (S30000). The storage apparatus 30 manages the capacities of the pool groups Tiers by Tiers.

As described below, system capacity pools are managed in the same way. If the capacity of the pool group #0 (30002) is depleted, or is about to deplete, the storage apparatus 30 adds the pool volumes of the pool group #1 (30004) that have a room in the capacity (proportion of the free capacity can be determined to be large if the proportion of the free capacity relative to the entire capacity is smaller than a predetermined value) to the pool group #0 (30002). Setting of the pool volumes across the pool modules is also possible as in the pool group #2 (30006). In that case, I/O that is inputted from the first module 1251*a* and that is for the volumes on the side of 1251*b* of #2 (30006) is processed through the network 1561.

The control processors 143 of FIG. 4 control the logical volumes connected in the modules 1251. For example, a control processor 143A executes processing of the pool volumes belonging to the pool volume group 30002. The processor as an entity of control that executes processing of the virtual volumes is the control processor 143 in the module to which the pool volume group belongs. The control processor 143A executes processing of the virtual volume #0.

<Dynamic Allocation Process of Storage Areas>

Figure 5:
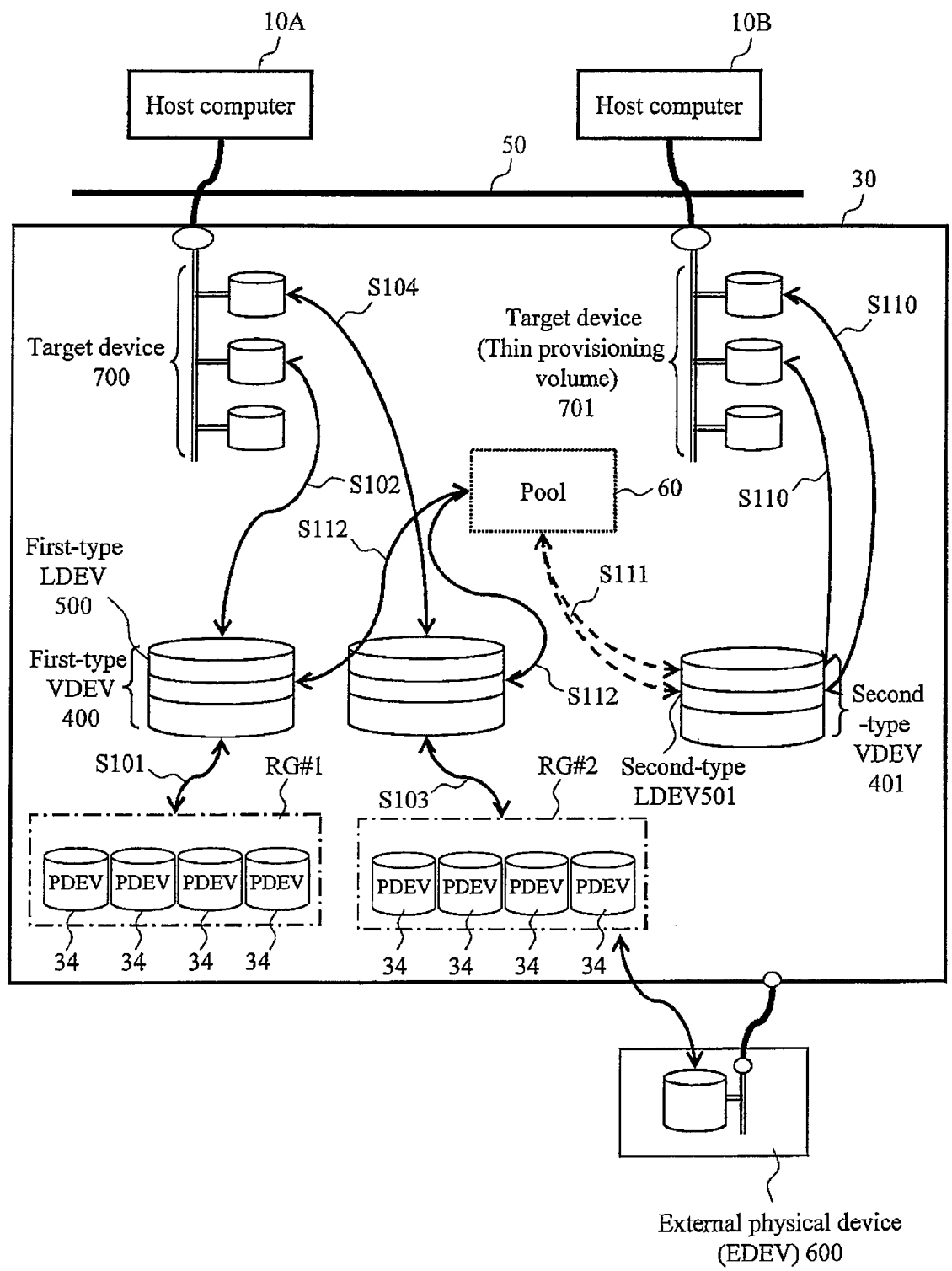
FIG. 5 is a functional block diagram showing an operation of dynamic allocation of storage areas performed by the storage apparatus.

FIG. 5 is a block diagram for explaining an operation of dynamic allocation of storage areas executed by the storage apparatus 30.

A RAID group is formed by the PDEVs 34 by a RAID configuration. The RAID group forms a VDEV 400 (S101). The VDEV 400 is divided into a plurality of logical devices (LDEVs) 500 as storage areas. The VDEV constituted by the PDEVs 34 will be called a "first-type VDEV". The LDEV included in the first-type VDEV will be called a "first-type LDEV".

The host computer 10A performs logical unit access for host access of the storage apparatus 30. The access target as seen from the host computer 10 will be called a "target device". A target device 700 is set in association with the definition of the path from the host computer 10A to the volumes including the first-type LDEV 500 (S102). The target device 700 corresponds one to one with the first-type LDEV 500.

The storage apparatus 30 can handle external physical devices 600 connected from the outside, in the same way as for the PDEVs 34. More specifically, the plurality of first-type VDEVs 400 are constituted by the plurality of external physical devices (EDEVs) 600 by a RAID configuration (S103).

The first-type VDEV 400 is divided into the first-type LDEVs 500 as one or more storage areas. The path to the host computer 10 is set to the first-type LDEVs 500 to set the target device 700 (S104). The storage apparatus 30 also sets a second-type VDEV 401. Unlike the first-type VDEV 400 constituted by the PDEVs 34, the second-type VDEV is a virtual device that has address areas but that does not have areas corresponding to the PDEVs 34.

The areas of the cache memory corresponding to the second-type VDEV 401 can be set. One or more LDEVs are included in the second-type VDEV 401. The LDEV will be called a second-type LDEV 501.

The path to the host computer 10B is set to the second-type LDEV 501 to set a target device 701 (S110). The target device 701 is an access target of the host computer 10B. The target device 701 is allocated to the second-type LDEV 501. The target device 701 and/or the second-type LDEV 501 are equivalent to virtual volumes.

Physical storage areas are not allocated from the PDEVs to the second-type VDEV 401 and the second-type LDEV 501. More specifically, since the storage areas are virtualized, the second-type VDEV 401 and the second-type LDEV 501 are different from the first-type VDEV 400 and the first-type LDEV 500. A pool 60 including real storage areas needs to be associated with the second-type LDEV 501 to allow the host computer 10B to use the virtual areas. The use of the pool is one of the features of the thin provisioning.

The pool 60 is a group formed by compiling one or a plurality of first-type LDEVs 500 based on one or a plurality of attributes. The first-type LDEVs 500 are allocated to the pool 60 (S112). The first-type LDEVs 500 correspond to the pool volumes.

An address is used to allocate the first-type LDEV 500 set to the pool to the second-type LDEV 501 (S111). Therefore, the storage area of the target device 700 is the first-type LDEV 500, and the storage area of the target device 701 is the second-type LDEV 501.

When the storage apparatus 30 receives access to the second-type LDEV 501 through the target device 701, the first-type LDEV 500 corresponding to the second-type LDEV 501 is set as an access destination.

Write data from the host computers 10A and 10B is stored in the first-type LDEV 500. The first-type VDEV 400 and the second-type VDEV 401 correspond based on the address. Therefore, the write data from the host is stored in the PDEVs 34.

RG denotes an abbreviation of the RAID group. One RG is constituted by the same type of PDEVs. The PDEV types are defined by at least one of performance and unit cost. The performance is, for example, a speed of I/O of data or a response time (time length from the reception of command from the host to the return of response). The unit cost is a price required to store data of a unit size (for example, so-called bit cost). For example, RG#1 is constituted by a plurality of SSDs, and RG#2 is constituted by a plurality of HDD-SASs. The capacities of the plurality of PDEVs constituting one RG are, for example, the same.

<Relationship Between Pools and Virtual Volumes>

Figure 6:
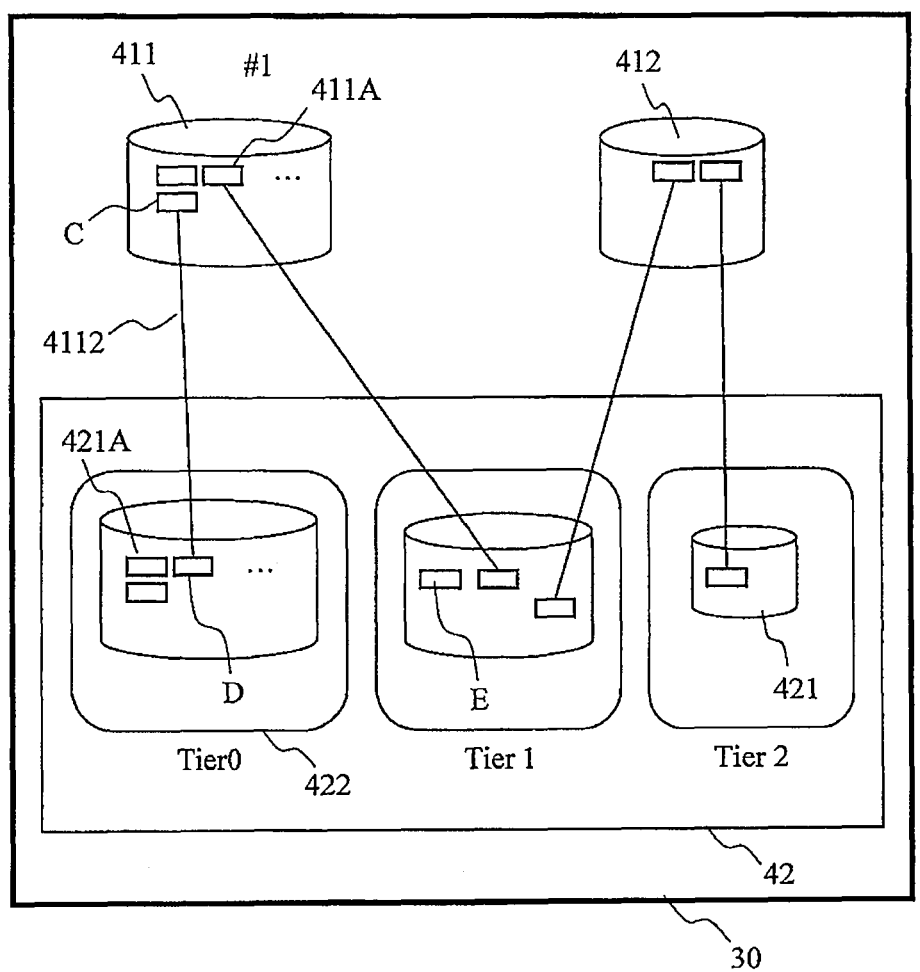
FIG. 6 is a diagram for explaining a correspondence between pool volumes and virtual volumes managed in tiers in accordance with the characteristics of a storage device as a supply source of the pool volumes.

FIG. 6 is a block diagram of the storage apparatus 30 including the correspondence between virtual volumes 411 and 412 and pool volumes 421. Reference numerals 411 and 412 denote the target devices 701. Reference numeral 42 denotes a configuration of a combination of the pool 60, the LDEV 400, and the PDEVs 34 of FIG. 5. Each pool includes a plurality of pool volumes 421. Reference numeral 421A denotes a page of the pool volumes.

The page is a unit of storage area formed by a predetermined capacity for processing read/write access from the host. The write data is stored in one or a plurality of pages. Alternatively, a page may be allocated once for the write access, and the write data of several write accesses may be stored in the same page. If the following write data cannot be stored in one page, a new page may be allocated to the write access in relation to the write data.

Reference numeral 411A denotes a virtual page of the virtual volume 411. The virtual page 411A is different from the page of the pool volumes 421 and is a unit of a virtual storage capacity that is not associated with a real storage area. Read/write from the host is processed virtual page by virtual page of the virtual volumes. When writing from the host is executed for the virtual volume, the real page of the pool volume is allocated to the virtual page of the virtual volume every time there is a write access.

Reference numeral 4112 denotes a line showing the correspondence between the virtual page of the virtual volume and the virtual page of the pool volume. The storage apparatus 30 sets the correspondence between the virtual volume and the pool and between the virtual volume and the pool volume and allocates the page to the virtual volume from the corresponding pool volume of the pool.

The storage apparatus 30 manages the pool volumes by mainly classifying the pool volumes into tiers (hereinafter, may be written as "Tiers" in the present specification) based on the characteristics of the storage device as a supply source of the pool volumes. The sections of the tiers include Tier 0, Tier 1, and Tier 2.

The media belonging to the tier of Tier 0 are classified as on-line storages, and examples of the media include fast-response, highly-reliable SSD, SAS, and fiber channel HDD. The media belonging to the tier of Tier 1 are classified as near-line storages, and examples of the media include an SATA hard disk and an ATA hard disk. The storage devices belonging to the tier of Tier 2 are classified as off-line storages, and examples of the storage devices include low-price, large-capacity tape devices. These are examples, and as described, the storage devices can be classified into the tiers based on a classification different from the described classification.

A basic operation will be described along with FIG. 6. The storage apparatus 30 provides the virtual volume 411 to the host computer 10 and includes a plurality of types of Tiers 422.

The virtual volume 411 is a virtual logical volume in accordance with the thin provisioning, in other words, a logical volume not based on a physical storage device (hereinafter, "PDEV"). The virtual volume 411 is constituted by a plurality of virtual pages 411A. The virtual pages 411A are virtual storage areas. It is assumed that there is one virtual volume #1 as the virtual volume 411. Hereinafter, a virtual page #b in a virtual volume #a will be written as a "virtual page #(a-b)". The virtual volume 411 of the thin provisioning provided to the host computer 10 includes a virtual capacity, and a real page is allocated in response to a write request from the host computer 10 to an address of a virtual page.

Therefore, except when the real pages are allocated to satisfy the virtual capacity, the total capacity of all real pages allocated to a virtual volume 411 is smaller than the virtual capacity. One virtual volume 411 is provided to one or more host computers 10, and when the virtual volume 411 is provided to a plurality of host computers 10, the plurality of host computers 10 share the virtual volume 411.

The Tiers 422 are constituted by a plurality of real pages 421A. The real pages 421A are substantive storage areas. The Tiers 422 include, for example, two Tiers 0 and 1. Hereinafter, a real page #d in a Tier #c will be written as a "real page #(c-d)". The Tiers 422 may be constituted by, for example, one or more real volumes. The real volumes are substantive logical volumes, in other words, logical volumes based on the PDEVs. Each of the plurality of Tiers 422 in one pool is set to be used by one or a plurality of virtual volumes 411 before the data is moved.

Although the host computer 10 is usually a computer, the host computer 10 may be another storage apparatus instead of the computer. The host computer 10 transmits, for example, an I/O (Input/Output) command to the storage apparatus 30. The I/O command is, for example, a write command or a read command and includes I/O destination information. The I/O destination information is information indicating the I/O destination and includes, for example, an ID of the virtual volume 411 (for example, LUN (Logical Unit Number)) and the address of the I/O destination (for example, LBA (Logical Block Address)). The virtual volume 411 and the virtual page of the I/O destination are specified from the I/O destination information.

It is assumed that the storage apparatus 30 has received a write command from the host computer 10 and that a virtual page #(1-C) is specified as the write destination based on the I/O destination information included in the write command. If the real page 421A is not allocated to the specified virtual page #(1-C), the storage apparatus 30 allocates a free (unallocated state) real page #(0-D) to the virtual page 421A and writes a data element of the write target to the allocated real page (0-D) in accordance with the write command.

The data movement between the Tiers is performed page by page in the present embodiments. Specifically, for example, the storage apparatus 30 executes the following processes as shown in FIG. 1:

(i) move the data element in the real page #(1-D) allocated to a virtual page #(0-C) to a free (unallocated state) real page #(1-E);

(ii) change the allocation source of the virtual page #(1-C) from the real page #(0-D) to the real page #(1-E); and (iii) update the state of the real page #(0-D) to free (unallocated state).

<Configuration Inside Memory of Storage Apparatus>

Figure 7:
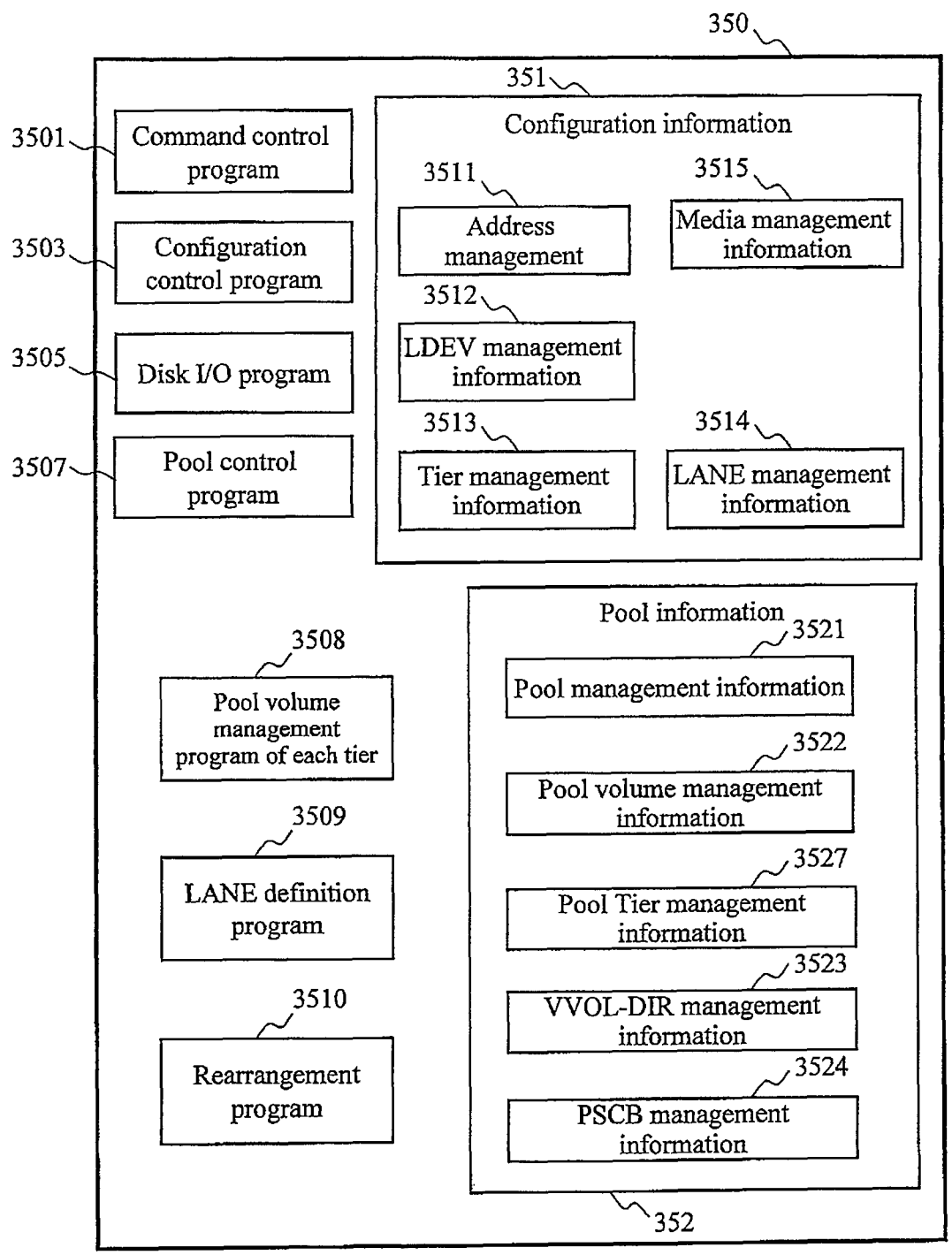
FIG. 7 is a diagram showing a software configuration inside the memory of the storage apparatus.

FIG. 7 is a block diagram showing an internal configuration of the memory 350 of the storage apparatus 30. The memory 350 stores various programs loaded and executed by the processor 360, configuration information 351 related to the setting of logical volumes, and pool information 352 related to the setting of the pool.

A command control program 3501 interprets a command from the host computer 10 or the management apparatus 20 to execute a process defined by the command. A configuration control program 3503 realizes processes, such as setting and updating of the configuration of the storage apparatus 30. A disk I/O program 3505 controls access to the PDEVs 34. A pool control program 3507 executes various processes related to setting of the pool.

The configuration information 351 is information necessary for setting the environment of the storage apparatus, such as VDEV, LDEV, tier, and RAID group. The configuration information 351 includes an address management table 3511, LDEV management information (table) 3512, Tier management information (table) 3513, and LANE management information (table) 3514. Additionally, VDEV management information (table) and RAID group management information (table) may also be included.

The address management table 3511 stores mapping information of addresses of the target device, the LDEV, the VDEV, and the physical device, mapping information of the target device and the LDEV, mapping information of the LDEV and the VDEV, and mapping information of the VDEV and the PDEV. The storage apparatus can refer to the address management table to recognize to which addresses of which LDEVs the target devices 700 and 701 correspond. To which address of which VDEV the address of the LDEV corresponds can also be recognized. To which RAID group the address of the VDEV belongs and to which address of which PDEV the address of the VDEV corresponds can also be recognized.

The LDEV management information table 3512 includes management information related to the LDEV. The Tier management information table 3513 includes management information of the tiers defined in the pool. The LANE management information table 3514 includes information of combinations of the tiers defined in the pool.

The pool information 352 stores setting related to the pool and includes a pool management information table 3521, a pool volume management information table 3522, VVOL (virtual volume)-DIR management information (table) 3523, PSCB (Pool Slot Control Block) management information (table) 3524, and a pool Tier management information table 3527.

The pool management information table 3521 includes management information related to the setting of the pool. The pool volume management information table 3522 includes management information related to the pool volumes of the pool 60. The VVOL-DIR management information table 3523 includes information related to the allocation of the LDEVs (pool volumes) of the pool to the virtual volumes. The PSCB management information 3524 includes information of the addresses of the LDEVs of the pool.

The pool Tier management information table 3257 includes management information of the tiers set to the pool. The table is set in each pool.

A pool volume management program 3508 of each tier manages the number of pool volumes in each tier and other characteristics of the pool volumes.

The command control program 3501 attains a process of dynamically allocating the pages from the pool volumes of the pool to the virtual volumes based on the access from the host apparatus.

The LANE definition program 3509 replaces the performance requirements instructed from the user by the LANEs to define the LANE management information 3514. The priority for using the tiers between the LANEs and the proportion of the usage between the tiers in the LANEs are defined. Setting and changing of LANEs to the virtual volumes are also performed. Pools suitable for the LANEs are also selected.

<Media Management Information Table>

Figures 8, 9, 10:
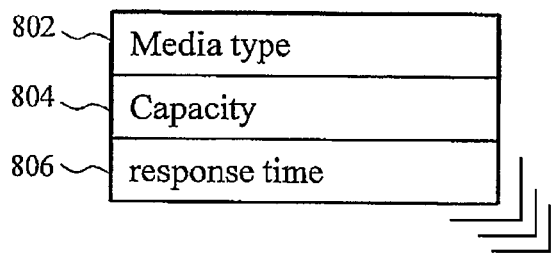
FIG. 8 is a diagram showing an example of configuration of a media management information table.
FIG. 9 is a diagram showing an example of configuration (1) of a tier management information table.
FIG. 10 is a diagram showing an example of configuration (2) of the tier management information table.

FIG. 8 is a diagram showing an example of configuration of a media management information table 3515.

The media management information table 3515 is created by the configuration control program 3503 when the medium is connected to the storage apparatus and includes a media type 802, a capacity 804, and a response time 806 as constituent items.

The media type 802 denotes the type of the medium. Examples of the type include SSD, FC (Fiber Channel), SAS (Serial Attached SCSI), and SATA (SerialATA) if the medium is a disk.

The response time 806 denotes a response time from the medium to a read or write instruction of data. In general, the shorter the time is, the higher is the processing performance of the medium. FIG. 8 is an example of the media management information and does not exclude other information.

<Tier Management Information Table>

FIGS. 9 and 10 show the tier management information table 3513. The management information is stored in the memory 350 as specific management information of the tier management information 3513.

The tier management information table (FIG. 9) shows the correspondence between Tier numbers and types of media. FIGS. 9 and 10 show an example of classification for associating the media with the tier numbers. The classification of media is based on the performance of the media.

Tier#902 denotes information showing identifiers of the Tiers. Reference numeral 904 denotes information indicating the storage locations of the media. "Inside" stored in the Tier#902 denotes an HDD (hard disk) included in the storage 30. "Outside" denotes another storage apparatus 30 externally connected from the storage apparatus 30, and in FIG. 9, for example, AMS2500 and 2100 are indicated as the external storage apparatuses.

The number of rotations 908 denotes information indicating the data transfer performance of media. This denotes the amount of data that can be transferred by the medium per unit time. In general, the greater the value is, the higher is the data transfer performance of the medium. A RAID level 910 denotes information indicating the levels of configurable RAIDS. Therefore, the media and the Tier numbers are associated based on 908 and the RAID level 910 that are elements affecting the performance of the storage.

FIG. 9 shows an example of the classification of the media into six types of tiers. The storage apparatus can extend the Tiers afterwards, such as when a new medium is added. The manager or the user may classify the timers, or the classification may be uniquely determined by the storage system. Another mode of the classification of media includes a method in which the viewpoint of bit cost is added in addition to the performance.

One Tier can be collectively formed if the performance, the cost, the reliability, and the like are substantially the same. For example, the Tier 1 and the Tier 2 of FIG. 9 may be put together.

FIG. 10 shows an example of three tiers (there are three Tiers) as a specific example of the following description. Items other than an item 906 are not illustrated.

The policy in the present embodiments is that the data is stored in high-performance media as much as possible, and the numbers of the Tiers are allocated in descending order of the performance of the media. In this way, storage areas for storing data by prioritizing the Tiers with smaller numbers are secured. As a modified variation, Tiers to be assigned may be initially designated.

Figures 11, 12A:
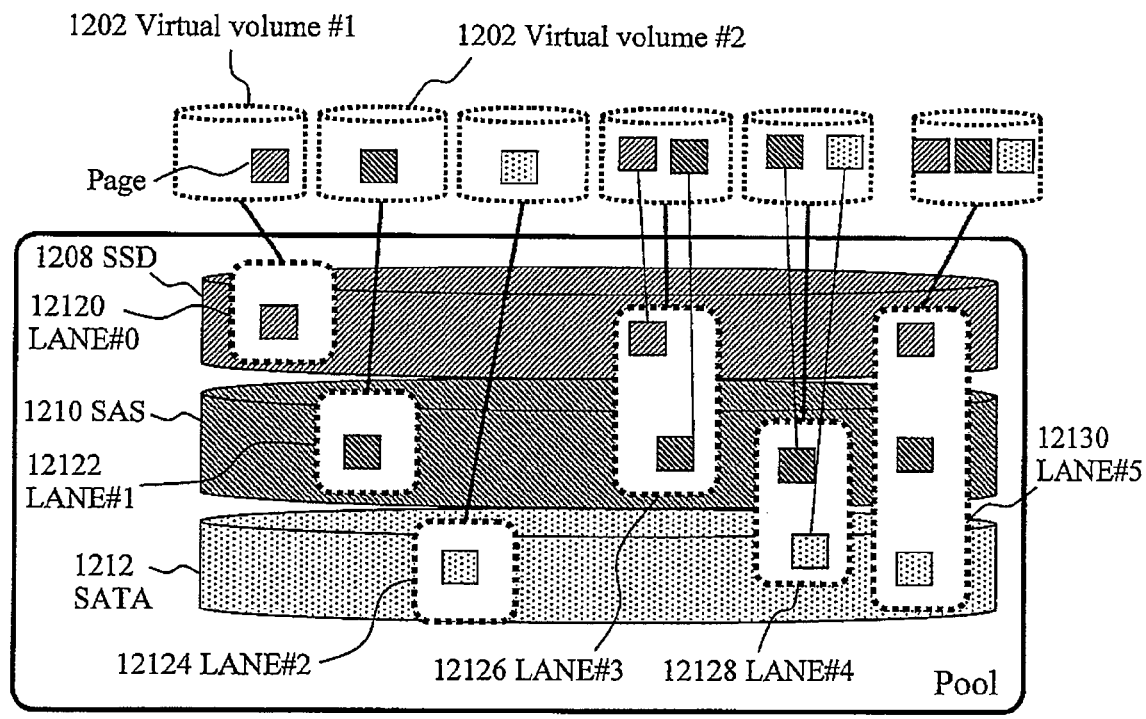
FIG. 11 is a diagram showing an example of configuration of a LANE management information table.
FIG. 12A is a diagram showing an example of combination (1) of LANEs.

One of the features of the storage apparatus 30 according to the present invention is that the Tier to be used is selected and set for each virtual volume. As shown in FIG. 12A, the virtual volumes allocate the storage areas page by page according to the access characteristics. In the example, the pool is divided into tiers of SSD, SAS, and SATA. The virtual volume #1 allocates pages from the SSD, and the virtual volume #2 allocates pages from the SAS. In this way, combinations of the Tiers in the used pool are defined for each virtual volume. The definition is called LANE (lane). More specifically, the LANE denotes information indicating the range of the Tiers that can constitute the virtual volumes. In an example of the LANE, the Tier 0 of FIG. 6 is set to the SSD, the Tier 1 is set to the SAS, and the Tier 2 is set to the SATA. In this case, six combinations shown in FIG. 12A are defined. FIG. 9B shows the Tier management information in the present example. The LANE management information table 3514 shown in FIG. 11 defines combinations of the tiers that are ranges of the LANEs. The LANE management information table 3514 includes information of the LANE numbers and the combinations of the Tiers as constituent items.

Figure 12B:
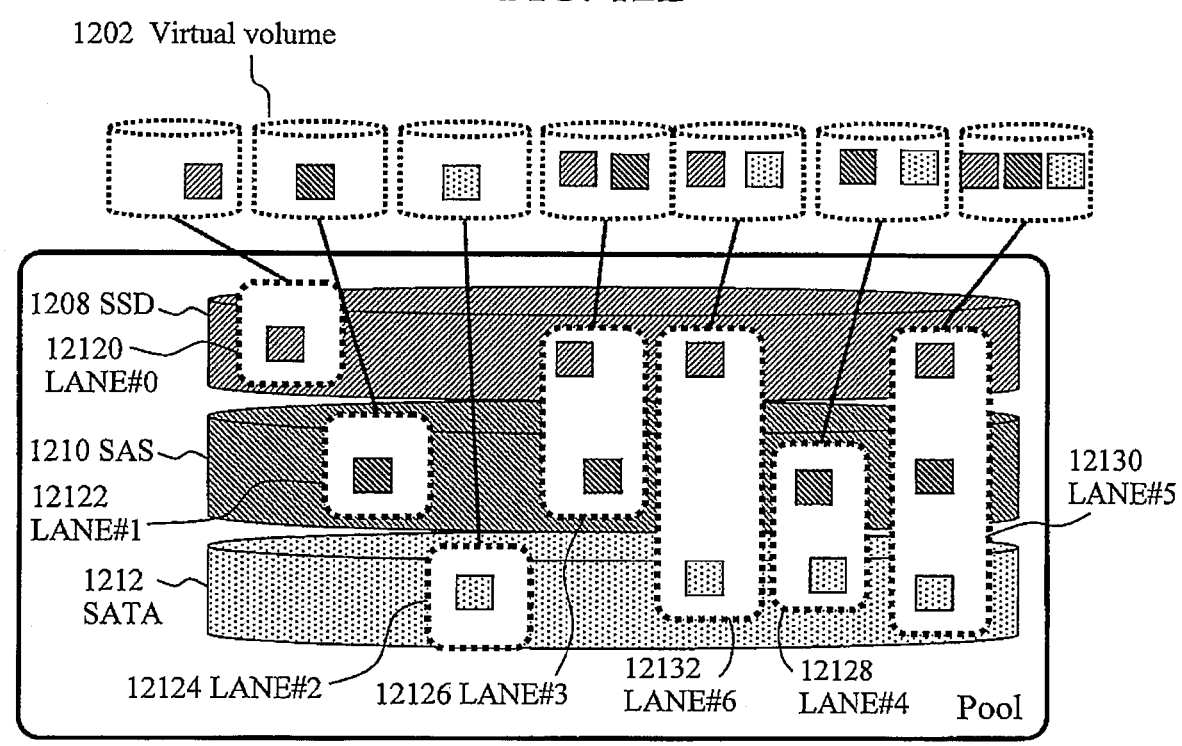
FIG. 12B is a diagram showing an example of combination (2) of LANEs.

FIGS. 12A and 12B are diagrams showing examples of the combinations of the Tiers constituting the LANEs. As shown in FIGS. 12A and 12B, the LANEs are constituted by single Tiers and combinations of a plurality of Tiers. It can be recognized from FIGS. 12A and 12B that the virtual volumes are constituted by using associated LANEs.

<LDEV Management Information Table>

Figure 13:
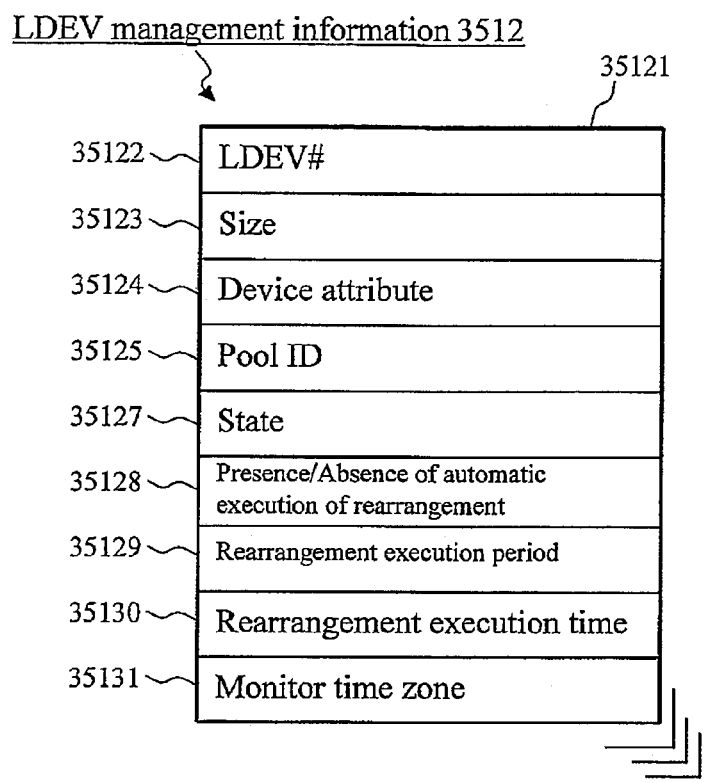
FIG. 13 is a diagram showing an example of configuration of a LDEV management information table.

FIG. 13 is a diagram showing an example of configuration of the LDEV (volume) management information table 3512. The LDEV management information table 3512 is constituted by a plurality of tables, and one table 35121 includes, as constituent items, an LDEV number (LDEV#) 35122, a size 35123, a device attribute 35124, a pool ID 35125, a device state 35127, information 35128 related to presence/absence of automatic execution of migration, a migration execution period 35129, migration execution time 35130, and a monitor time zone 35131.

The LDEV#35122 is information indicating the identifier of the LDEV. The size 35123 is information indicating the total size set to the LDEV. If the LDEV is a virtual volume, the size is virtualized.

The device attribute 35124 is information indicating the identifier of the attribute of the LDEV. An identifier indicative of the first-type LDEV is stored if the LDEV is the first-type LDEV, and an identifier indicative of the second-type LDEV is stored if the LDEV is the second-type LDEV. An identifier indicative of the pool attribute is stored if the LDEV is set to the pool.

In the field of the pool ID 35125, the identifier is stored if the LDEV is set to the pool. If the LDEV is set to the virtual volume, the number of the pool ID, to which the storage areas are allocated when the data is stored, is stored in the field.

The state 35127 is information indicating the state of the VDEV to which the LDEV belongs. Examples of the value of the state include normal, block, and failure block. The block indicates blocking due to a factor other than failures, such as an overflow block. The failure block indicates blocking due to a failure in one of the devices.

The information 35128 related to the presence/absence of the automatic execution of migration indicates whether to automatically or manually start the migration of the data elements in the virtual volume. "ON" denotes that the migration will be automatically started, and "OFF" denotes that the migration will be manually started. The presence/absence of migration may be able to be set. More specifically, whether to migrate the data elements in the virtual volume is determined based on the information. The data elements are migrated if "ON" is set, and the data elements are not migrated if "OFF" is set. The I/O frequency of the virtual volumes or the virtual pages is monitored in the case of "ON", and the I/O frequency of the virtual volume or the virtual pages is not monitored in the case of "OFF".

The migration execution period 35129 is information indicating the period of the migration of the data elements in the virtual volume. The migration execution time 35130 is information indicating the time of the start of the migration of the data elements in the virtual volume. The monitor time zone 35131 is information indicating the time zone of monitoring the I/O frequency of the virtual volumes or the virtual pages.

Although the presence/absence 35128 of the migration automatic execution, the migration execution period 35129, the migration execution time 35130, and the monitor time zone 35131 are the same information as the information elements in the pool management information 3521 described below, the value in the table may be prioritized if a value of an information element (for example, "migrate") in the table is different from the value of the same information element (for example, "migrate") in the pool management information 3521. More specifically, in the pool management information 3521, the values of the information elements are set for one pool, and as a result, the values can be reflected on the settings of all virtual volumes to which the pool is allocated. However, the values can be set for each virtual volume if the LDEV (volume) management information table 3512 is used. Therefore, if values are not particularly set for a virtual volume, the values set for the pool allocated to the virtual volume are handled as the values of the virtual volume.

The LDEV management information tables 3512 are set or updated by an operation from the user or the manager based on the configuration control program 3503, and the tables are managed by the LANE numbers. The same applies to the following management tables.

For example, a case in which the pool is allocated to the virtual volumes as shown in FIG. 6 in the LANE configuration as shown in FIG. 11 will be considered. According to FIG. 11, the LANE 3 is constituted by a combination of the Tier 0 and the Tier 1, and the LANE 4 is constituted by a combination of the Tier 1 and the Tier 2. If the pool is defined to be formed in the LANE 3, the virtual volume 411 uses the Tiers 0 and 1. If the pool is defined to be formed in the LANE 4, the virtual volume 412 uses the Tiers 1 to 2. Since the virtual volumes 411 and 412 use the same pool, the pool IDs indicate the same identifiers.

The LANE setting allows selecting the tiers (Tiers) to be used in the virtual volumes and allows limiting the tiers to be used among all tiers. As a result, the pages can be allocated from the media according to the performance requirements necessary for the application that accesses the virtual volumes. It is novel that the tiers are controlled not application by application, but virtual volume by virtual volume, which is a more detailed unit in the application. Therefore, a plurality of virtual volumes used by the application can be allocated to high-performance media and other media. Furthermore, limiting the allocated tiers allows allocation of the high-performance media to really necessary virtual volumes. The prices of the high-performance are high, and in general, the proportion of the high-performance media in the entire capacity is small. Few resources can be effectively used. Conventionally, the high-performance media are allocated if the access frequencies of the virtual volumes are the same. Therefore, highest-performance media are used for data with not high performance requirements if the access frequency is high. According to the LANE control, the physical pool is not divided, and the division and the usage are possible with the single pool. Therefore, the load is small, and the performance can be realized in the method.

<Pool Management Information Table>

Figure 14:
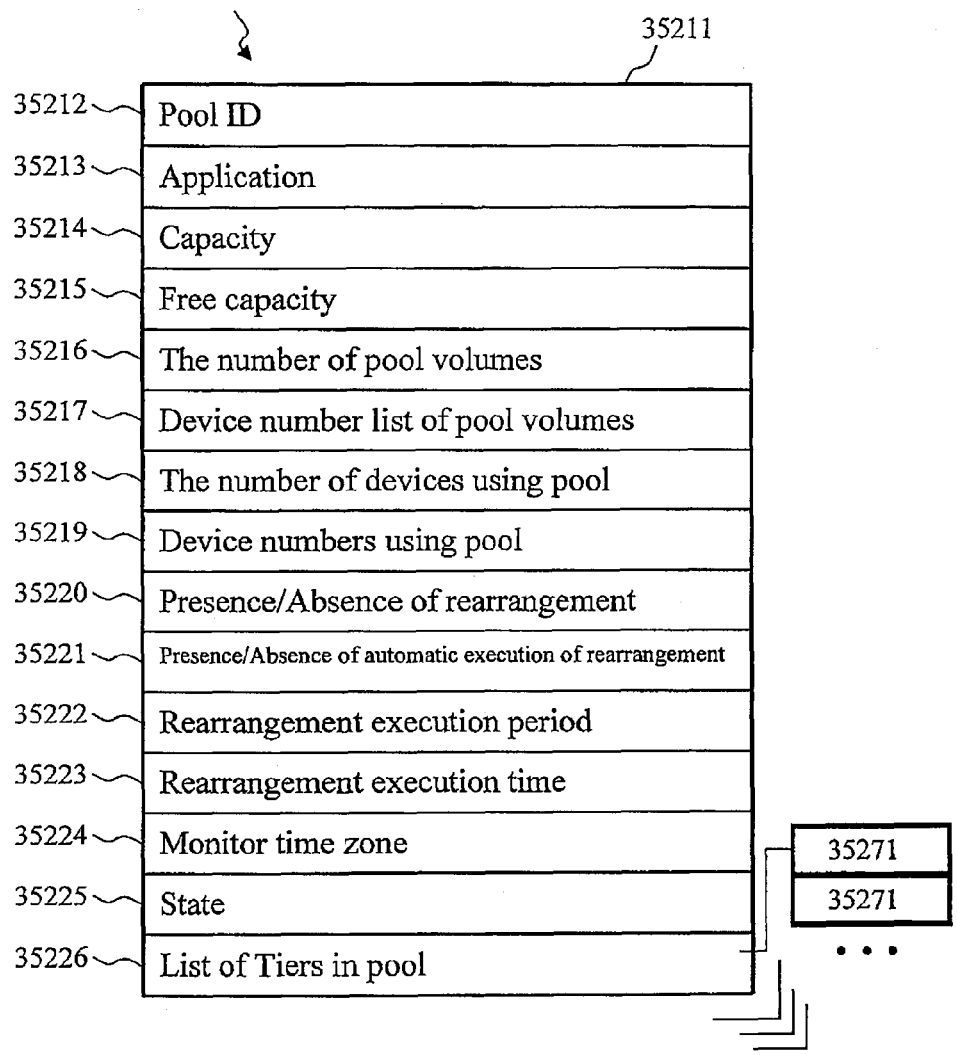
FIG. 14 is a diagram showing an example of configuration of a pool management information table.

FIG. 14 is a diagram showing an example of configuration of the pool management information table 3521. The pool management information 3521 is constituted by a plurality of pool-specific information tables 35211. The pool-specific information 35211 includes, as constituent items, a pool ID 35212, an application 35213, a capacity 35214, a free capacity 35215, the number of pool volumes 35216, a pool volume device number list 35217, the number of devices 35218 using pool, a device number 35219 using pool, presence/absence 35220 of migration indicating whether to perform migration, presence/absence 35221 of migration automatic execution, a migration execution period 35222, migration execution time 35223, a monitor time zone 35224, a state 35225, and a list 35226 of Tiers in pool. The information of the capacity 35214 and the free capacity 35215 is held for each medium.

The pool ID 35212 is an identifier of the pool. The application 35213 is an identifier indicating the application of the pool. The application is an application in a pool operation format, such as thin provisioning, snapshot, and remote copy.

The capacity 35214 is information indicating the real capacity of the pool. In the pool management information table 3521 of FIG. 14, a virtualized capacity (virtual capacity) may be registered for the host computer 10. The free capacity 35215 is information indicating the unused real capacity of the pool. The total real capacity of the capacity-virtualized pool, the used real capacity, or one or a plurality of combinations of the capacities may be registered in the table.

The number of pool volumes 35216 is information indicating the total number of LDEVs set as the pool. The pool volume device number list 35217 is information indicating a list of LDEV numbers set as the pool.

The number of devices 35218 using pool is information indicating the number of pool volumes belonging to the pool. The device number 35219 using pool is information indicating a list of IDs of the pool volumes belonging to the pool. The number of devices 35218 using pool and the device number 35219 using pool may be set for each tier.

The presence/absence 35220 of migration is information indicating whether to migrate the data elements in the target pool, and "ON" or "OFF" is written. "ON" denotes that the migration will be performed, and "OFF" denotes that the migration will not be performed. In the case of "ON", the I/O frequency of the virtual volumes or the virtual pages to which the target pool is allocated is monitored, and in the case of "OFF", the I/O frequency of the virtual volumes or the virtual pages to which the target pool is allocated is not monitored. What is important in relation to the monitoring of the I/O frequency is that the I/O frequency is not updated when I/O is not actually performed for the real pages allocated to the virtual volumes or the virtual pages of the I/O destination and that the I/O frequency is updated when I/O is performed for the allocated real pages. The point will also be described below in a write process and a read process.

The presence/absence 35221 of migration automatic execution is information indicating whether to automatically or manually start the migration of the data elements in the target pool, and "ON" or "OFF" is described. "ON" denotes that the migration will be automatically started, and "OFF" denotes that the migration will be manually started.

The migration execution period 35222 is information indicating the period of the migration of the data elements in the target pool. For example, "one day" denotes that the migration starts every one day (24 hours).

The migration execution time 35223 is information indicating the time of the start of the migration of the data elements in the target pool.

The monitor time zone 35224 is information indicating the time zone for monitoring the I/O frequency of the real pages allocated to the virtual volumes to which the target pool is allocated.

The state 35225 is information indicating the status of the target pool. Examples of the values of the state include "monitoring", "rearranging", and "not monitoring". "Monitoring" denotes that the I/O frequency of the virtual volumes, to which the target pool is allocated, or of the virtual pages in the virtual volumes is being monitored and that the data elements are not being migrated. "Rearranging" denotes that the data elements are being migrated (may be migration within the target pool or may be migration of the data elements from the target pool to another pool). "Not monitoring" denotes that the I/O frequency is not being monitored and that the data elements are not being migrated.

The list 35226 of tiers in pool is information indicating a view of a list of tier information set to the pool. Although the list 35226 of tier information will be described later, the list 35226 of tier information is an example of the tier management information table 3513.

The configuration control program 3503 sets and updates the pool management information table 3521 of FIG. 14.

<Pool Tier Management Information Table>

Figure 15:
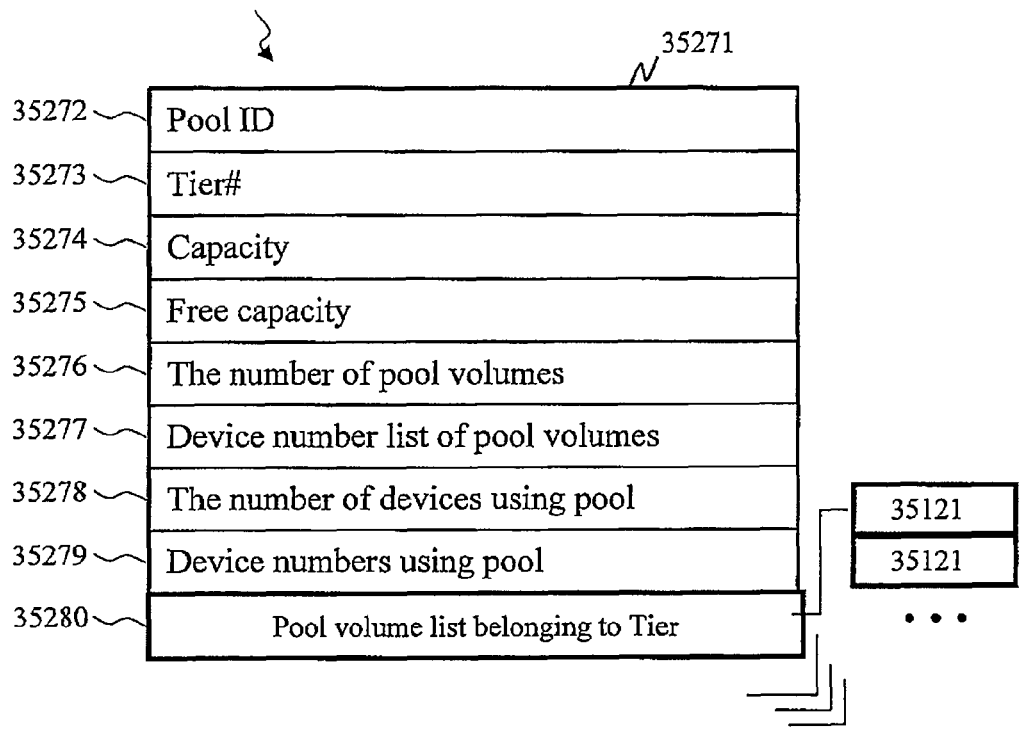
FIG. 15 is a diagram showing an example of configuration of a tier management information table for managing tiers of a tiered pool.

FIG. 15 is a diagram showing an example of configuration of the pool tier management information table 3513. The pool tier management information table 3513 includes at least one configuration table 35271, and each configuration table 35271 includes, as constituent items, a pool ID 35272, a tier number 35273, a capacity 35274, a free capacity 35275, the number of pool volumes 35276, a pool volume device number list 35277, the number of devices 35278 using pool, a device number 35279 using pool, and a list 3S280 of pool volumes belonging to tier. Hereinafter, only parts different from the management information table of pool (FIG. 14) will be described for the information.

The tier number 35273 is identification information of tiers set to the pool (see FIGS. 8 and 9). For example, if a plurality of tiers are set in the pool, the configuration table 35271 of FIG. 15 is set for each tier. More specifically, if there are three tiers, the pool tier management information table 3513 includes three configuration tables 35271.

The capacity 35274 is a total real capacity included in each tier (Tier#: 35273). The sum of the capacities 35274 of the tiers denotes a value of the capacity 35214 in the configuration table 35211 of the pool management information table 3521.

The free capacity 35275 denotes the size of the unused area of the tier. The sum of the free capacities 35275 of the tiers denotes a value of the free capacity 35215 in the configuration table 35211 of the pool management information table 3521.

The contents of the number of pool volumes 35276, the pool volume device number list 35277, the number of devices 35278 using pool, and the device number 35279 using pool are as already described, and the information is set for each tier.

The pool volume list 3S280 belonging to tier includes the list 35121 of pool volumes belonging to each tier (see FIG. 13). If the pool is across a plurality of modules (clusters) as shown in FIG. 4, information for distinguishing the modules is added to the pool management information table 3521 (see FIG. 14), and the information in the table is managed module by module.

If the tiers are not set in the tables, NULL is registered in the fields of information related to the tiers.

<VVOL-DIR Management Information Table and PSCB Management Information

Figure 16:
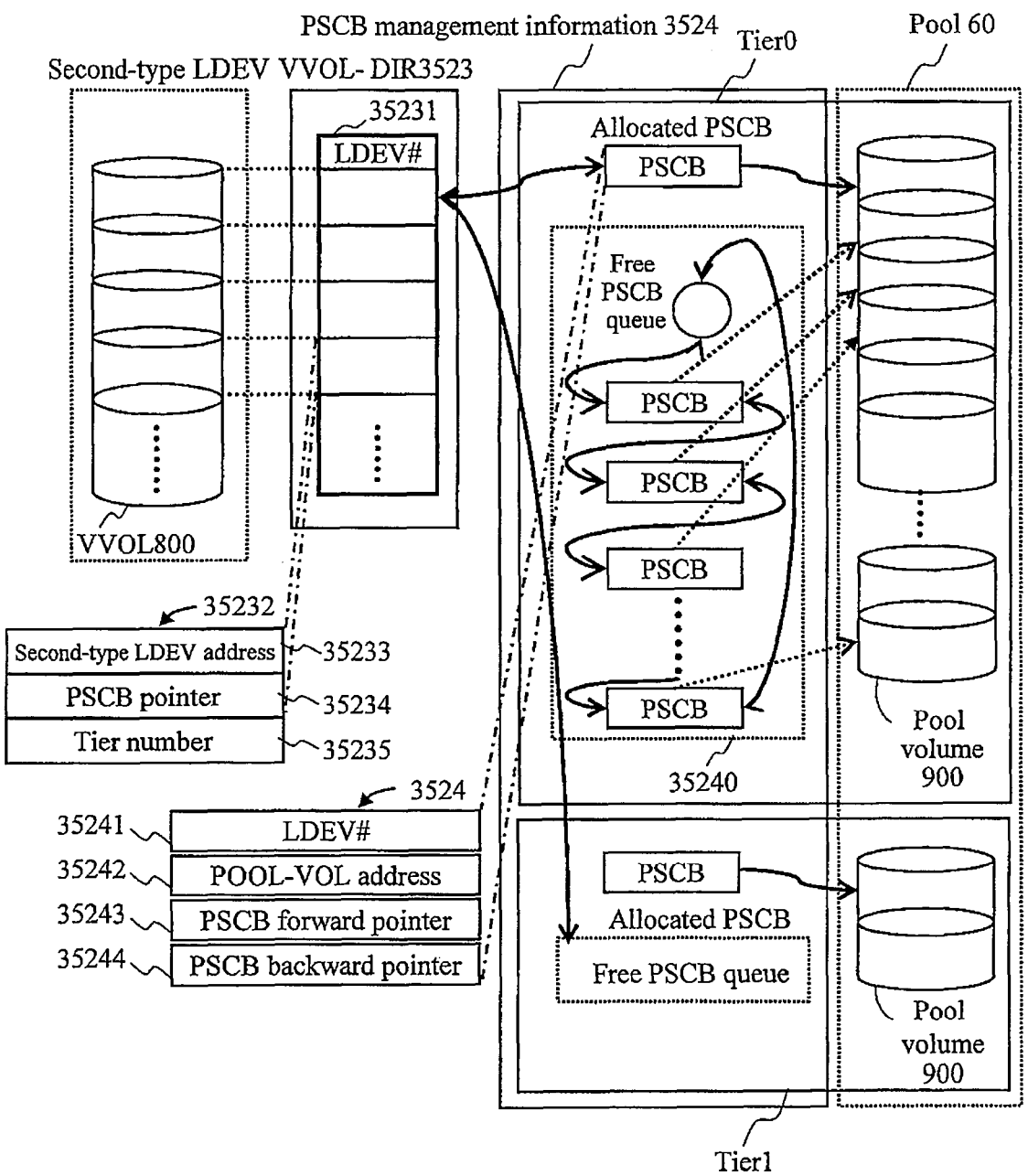
FIG. 16 is a block diagram for explaining VVOL-DIR and PSCB.

FIG. 16 is a diagram for explaining the VVOL-DIR management information table 3523 and the PSCB management information 3524.

The VVOL-DIR management information table 3523 is information indicating a configuration of the second-type LDEV for forming the virtual areas of the virtual volumes. The PSCB (Pool Slot Control Block) management information 3524 is information indicating a configuration of the first-type LDEV set to the pool 42.

As described, in the storage apparatus 30, the first-type VDEV 400 is formed by the PDEV 34 by the RAID configuration. The first-type VDEV 400 is divided into the first-type LDEVs 500 as storage areas. The first-type LDEVs 500 are set to the pool 60. The first-type LDEVs 500 set to the pool 42 are pool volumes 900.

The storage apparatus 30 sets virtual volumes (VVOLs) 800 and further constitutes second-type LDEVs 35231 (equivalent to the second-type LDEVs 501 in FIG. 5). The second-type VDEV 401 is divided into the second-type LDEVs 35231 (VVOLs 800) as virtual storage areas of the virtual volumes.

The storage apparatus allocates the second-type LDEVs 35231 as the virtual volumes 800 to the first-type LDEVs 500 as the pool volumes. As a result, the storage areas of the virtual volumes accessed by the host computer 10 correspond to the first-type LDEVs 500 constituted by the PDEVs 34 as physical devices.

The configuration of the virtual volumes 701 is stored in the VVOL-DIR 3523. The VVOL-DIR 3523 is constituted by the LDEV number (LDEV#) 35231 and an entry 35232.

The LDEV number (LDEV#) 35231 is information indicating an identifier of the second-type LDEV 35231. The entry 35232 is configuration information of the second-type LDEV 35231 and is constituted by a second-type LDEV address 35233, a PSCB pointer 35234, and a tier number 35235. The PSCB pointer 35234 stores a pointer of an area of the first-type LDEV 500 when the second type LDEV 35231 is allocated to the first-type LDEV 500 of the pool volumes 900. The second-type LDEV 35231 is not allocated to the first-type LDEV 500 in the initial state, and "NULL" is stored in the PSCB pointer 35234.

The PSCB management information 3524 is information of the first-type LDEV 500 set to the pool 60. The PSCB management information 3524 is set for each slot of the first-type LDEV 500 set to the pool 60.

Each piece of the PSCB management information 3524 is constituted by an LDEV number (LDEV#) 35241, a pool volume address 35242, a PSCB forward pointer 35243, and a PSCB backward pointer 35244. The LDEV number (LDEV#) 35241 is information indicating an identifier of the first-type LDEV in the pool volumes. The pool volume address 35242 is information indicating the address of the first-type LDEV in the pool volumes 900. The PSCB forward pointer 35243 and the PSCB backward pointer 35244 denote information indicating identifiers of the slots before and after the first-type LDEV in the pool volumes 900.

The top of an unused area in the areas of the pool volumes 900 is indicated by a free PSCB queue 35240. The free PSCB queue 35240 includes a pointer to the PSCB 3524 indicating the next slot.

The storage apparatus 30 refers to the pointer indicated by the free PSCB queue 35240 to obtain the next PSCB 3524. The storage apparatus 30 further refers to the PSCB backward pointer 35244 of the next PSCB 3524 to gradually follow the PSCBs 3524 to obtain the PSCB 3524 corresponding to the last slot of the unused area. The PSCB backward pointer 35244 of the last PSCB 3524 is the free PSCB queue 35240.

The storage apparatus 30 can follow the free PSCB queues 35240 to recognize the unused areas of the pool volumes 900 of the pool based on a set of connected pointers of the PSCBs 3524.

The storage apparatus 30 sets the PSCB 3524 corresponding to the first-type LDEV 500 set in the pool 60. Specifically, the PSCB 3524 corresponding to each slot of the first-type LDEV 500 set to the pool 60 is set, and the free PSCB queue 35240 is further set. Since the pools 42 are all unused in the initial state, the set connected by the free PSCB queues 35240 corresponds to all areas of the first-type LDEVs 500 set to the pools.

When the storage apparatus 30 uses the areas of the pool 60, the storage apparatus 30 can allocate the PSCBs 3524 of necessary slots to the VVOL-DIR management information table 3523 managing the second-type LDEVs 35231 to use the areas.

One slot or a set of a plurality of slots is equivalent to a page. The page is specified by one or a plurality of PSCBs 3524. The access from the host apparatus 10 to the virtual volumes 800 and the allocation of the storage areas from the pool volumes 900 to the access areas of the virtual volumes 800 are performed page by page.

More specifically, the storage apparatus 30 refers to the free PSCB queues 35240 to acquire the PSCBs 3524 of the necessary areas (pages) allocated to the second-type LDEVs 35231. The storage apparatus 30 then allocates the acquired PSCBs 3524 to the entries 35232 of the VVOL-DIR management information table 3523. Therefore, the storage apparatus 30 stores the pointers indicating the corresponding PSCBs 3524 in the PSCB pointers 35234 of the entries 35232 of the VVOL-DIR management information table 3523. The allocated PSCBs 3524 are removed from the connection of the free PSCB queues 35240.

As a result, each page (slot) of the second-type LDEVs 35231 is allocated to the PSCB management information 3524 indicated by the PSCB pointer 35234 of each entry 35232 of the VVOL-DIR management information table 3523. The PSCB management information 3524 corresponds to the slots of the first-type LDEVs 500. As a result, the second-type LDEVs 35231 are allocated to the first-type LDEVs 500, and the virtual volumes 800 as access targets of the host computer 10 can be used as physical devices.

The storage apparatus 30 manages the free PSCBs 35240 tier by tier. FIG. 16 illustrates the Tier 0 and the Tier 1 as the tiers, and the pool 60 is also managed by the same tiers. Areas are allocated page by page from a plurality of tiers (for example: Tier 0 and Tier 1) to one second-type LDEV 35231. The storage apparatus 30 manages the page-by-page information as information of PSCBs. The tier number 35235 is a number of the tier to which the PSCB belongs.

When a write request is received from the host computer 10, the command control program 3501 follows the VVOL-DIR management information tables 3523 based on the addresses of the virtual volumes 800 included in the write request to check whether the PSCBs are allocated to the entries of the VVOL-DIR 3523. If the PSCBs are allocated, the command control program 3051 overwrites the already existing PSCBs with the write data. On the other hand, if the PSCBs are not allocated, the command control program 3501 selects the PSCBs to be connected to the free PSCB queues allocated to the numbers of the target tiers to allocate the PSCBs to the entries 35232 of the VVOL-DIR management information table 3523.

The page-by-page information also includes information obtained from the verification of the state of the pages. For example, the information is obtained as a result of periodical monitoring of the frequency of access to the pages. Information may be attached in each page of the pool 60, and the data stored in the pool volumes 900 may include information that allows searching to which address of which virtual volume 800 the data is allocated.

The LDEV management information table (FIG. 13), the pool management information table (FIG. 14), and the tier management information table (FIG. 15) are held in each storage apparatus 30. The management apparatus 20 can hold the information of the management information tables (FIGS. 13 to 15) of all storage apparatuses 30.

<Initial Setting Process>

Figure 17:
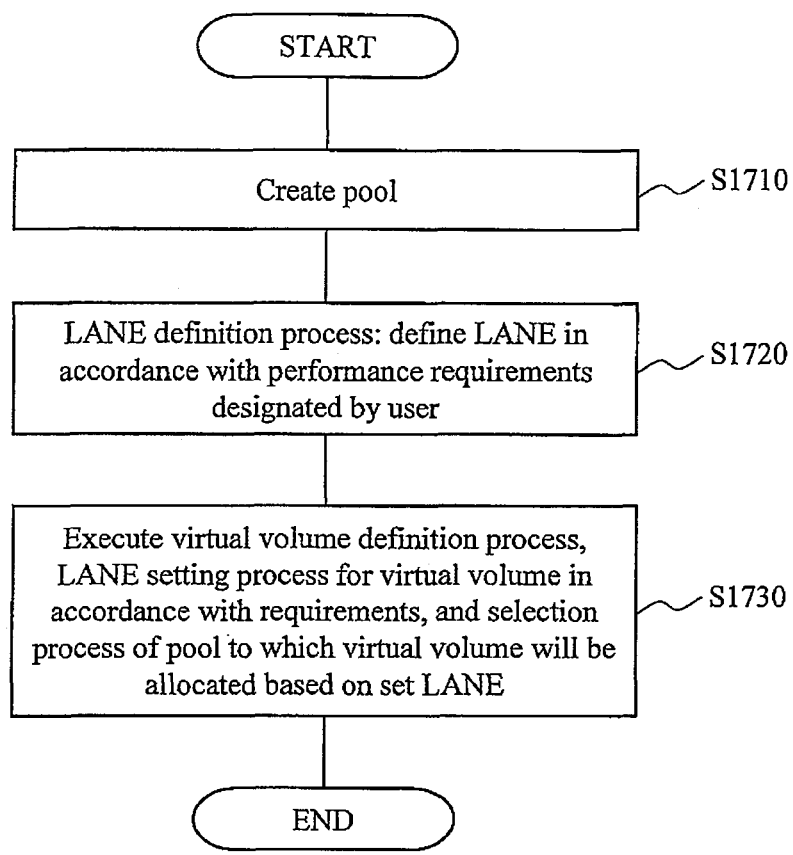
FIG. 17 is a flow chart for explaining a summary of the entire process from pool creation to virtual volume allocation.

FIG. 17 is a flow chart for explaining the summary of an initial setting process. FIG. 17 simply describes an overall flow of the initial setting process, and the details of the steps will be described later. Entities of operations in the steps of FIG. 17 are predetermined programs of the management apparatus 20 and the storage apparatus 30. Therefore, in the description of FIG. 17, one of the management apparatus 20 and the storage apparatus 30 forms the entity of operation, or the management apparatus 20 and the storage apparatus 30 collaborate to form the entity of operation.

The management apparatus 20 and the storage apparatus 30 first collaborate to create the entire pool and register the information of the created pool in the pool management information table 3521 (S1710).

The storage apparatus 30 then defines the LANE management information from the types of media installed on the storage apparatus 30 and defines the LANEs by combinations of the Tiers in the pool (S1720).

Lastly, the storage apparatus 30 defines the virtual volumes 800 (S1730). In S1730, in addition to the process of defining the virtual volumes 800, processes of setting the LANEs to the virtual volumes 800 and selecting the pool to be used are executed.

<Creation of Pool>

Figure 18:
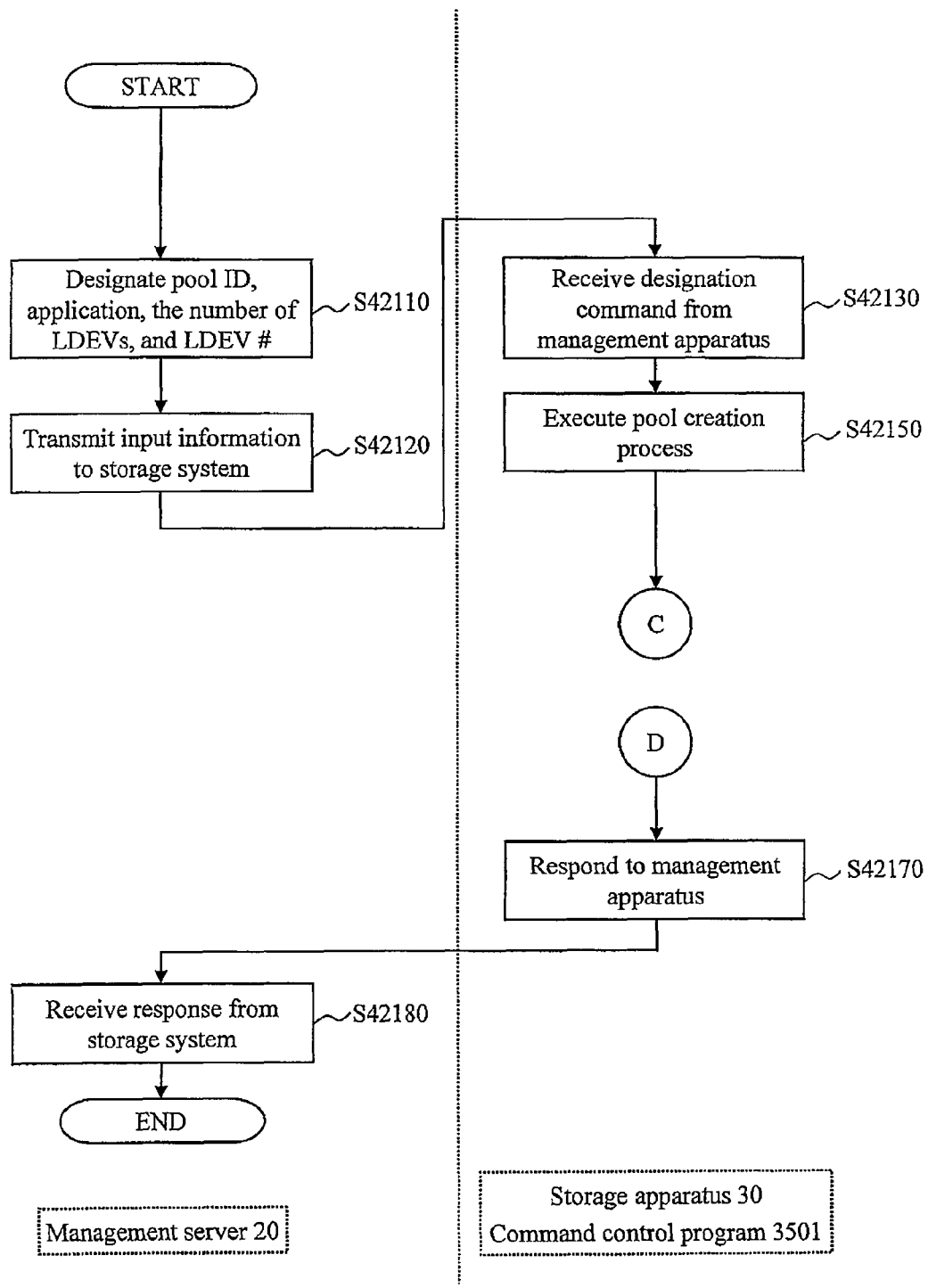
FIG. 18 is a flow chart (1) for explaining a pool creation process.
Figure 19:
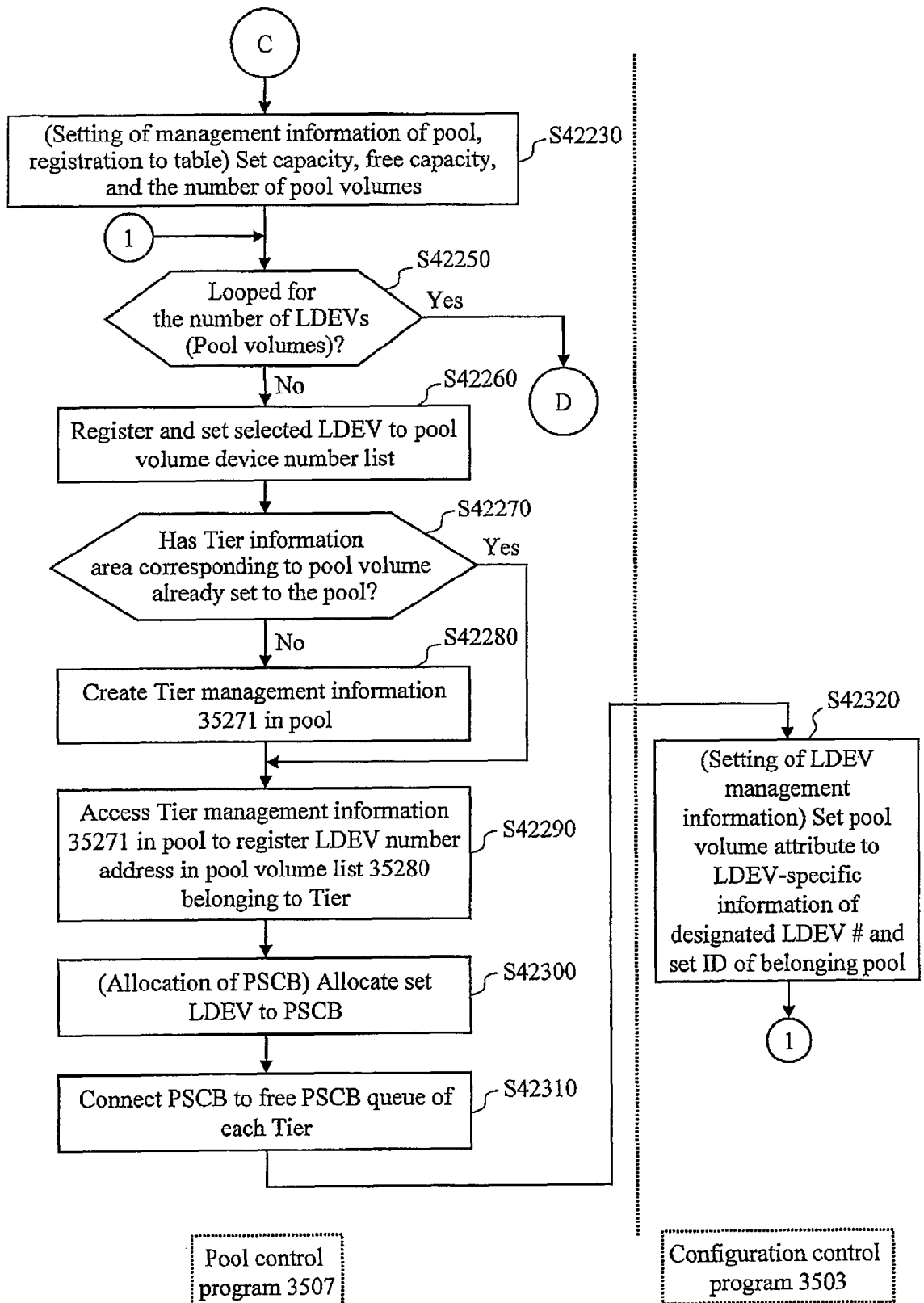
FIG. 19 is a flow chart (2) for explaining the pool creation process.

FIGS. 18 and 19 are flow charts for explaining the details of the pool creation process of S1710.

A management program (not shown) of the management apparatus 20 first receives the pool ID as the identifier of the pool, the application, the number of first-type LDEVs, and the numbers of the LDEVs inputted by the manager operating the GUI (S42110).

The management program of the management apparatus 20 generates a creation command of pool including the input information and transmits the command to the storage apparatus 30 (S42120).

The command control program 3501 of the storage apparatus 30 receives the created command transmitted from the management apparatus 20 (S42130).

When the command control program 3501 determines that the received command is for the setting process of pool, the command control program 3501 transfers the received command to the pool control program 3507 and instructs the pool control program to execute the setting/creation process of pool based on the received command (S42150).

Subsequently, the pool control program 3507 sets the capacity, the free capacity, and the number of pool volumes to the pool-specific information in the pool management information table 3521 based on the information designated by the command (S42230).

The pool control program 3507 determines whether the process of S41260 to S41320 is executed for the number of LDEVs (pool volumes) instructed by the command (S42250).

If the process of S41260 to S41320 is executed for the number of LDEVs (pool volumes) instructed by the command (Yes in S42250), the process moves to S42170. If the process of S41260 to S41320 is not executed for the number of LDEVs (pool volumes) instructed by the command (No in S42250), the process moves to S42260.

In S42260, the pool control program 3507 selects one of the LDEVs designated by the command as the LDEVs constituting the pool volumes and registers the selected LDEV in the pool volume device number list 35217 of the pool management information table 3521 (S42260).

In relation to the pool volume instructed by the command, the pool control program 3507 determines whether the tier management information 35271 is already set to the tier information area (the list 35226 of tiers in pool) corresponding to the pool volume (S42270).

If the tier management information 35271 is already set (YES in S42270), the process moves to S42290. If the tier management information 35271 is not set yet (No in S42270), the pool control program 3507 creates the table 35271 of the management information managing the tiers of the pool, registers the table 35271 in the list 35226 of tiers in pool of the pool management information table 3521, and moves the process to S42290 (S42280).

In S42990, the pool control program 3507 accesses the corresponding configuration table 35271 in the tier management information table 3513 and registers the LDEV number ID in the pool volume list 3S280 belonging to the tier (S42290).

The pool control program 3507 then allocates the PSCB to the first-type LDEV set to the pool volume (S42300) and connects the PSCB to the free queue of each tier (S42310).

When the pool control program 3507 sets the first-type LDEV to the pool volume by the process, the configuration control program 3503 sets the LDEV management information table 3512 (FIG. 13) to enable managing which LDEV is used in the pool volume (S42320). As a result, the plurality of first-type LDEVs set and not set as the pool volumes can be identified and managed. More specifically, the configuration control program 3503 sets the identifier (pool volume attribute), which indicates the LDEV constituting the pool volume, to the device attribute 35128 in the LDEV management information table 3512 (corresponding configuration table 35121) of the LDEV number designated by the command and registers the pool ID, to which the pool volume belongs, in the pool ID.

Subsequently, the configuration control program 3503 transfers the control right to the pool control program 3507. The pool control program 3507 moves the process to S42250 and transfers the control right to the command control program 3501 if the pool control program 3507 determines that the processes to all LDEVs are finished (Yes in S42250).

As shown in FIG. 18, in S42170, the command control program 3501 transmits a response of the success of the command to the management apparatus 20 (S42170).

When the response from the storage apparatus 30 is received (S42180), the management program (not shown) of the management apparatus 20 ends the series of processes.

Although the generation of pool based on the user instruction from the management apparatus 20 has been described in FIGS. 18 and 19, the pool may be generated based on the user instruction inputted from the host computer 10 or the maintenance management terminal 153, instead of the management apparatus 20.

If the type of medium that needs to be used to create the pool is included in the input information from the user, the storage apparatus 30 first determines whether the designated medium exists and executes a new setting process of the pool according to FIGS. 18 and 19 if the medium exists. If the designated medium does not exist, the storage apparatus 30 notifies the user that there is no designated medium in the system.

<LANE Definition Process>

Subsequently, the details of the process of creating the LANE definition shown in FIG. 11 (S1720) will be described. As for the definition of LANE, there are a method of executing the LANE definition in accordance with an instruction of which Tier(s) should be set in a LANE, a method of the storage apparatus 30 defining the LANE according to requirements after the input of performance requirements and cost requirements (method of replacing the performance requirements of the application of the host computer 10 by LANE), and the like. A specific example of the latter method will be particularly described here.

When the performance requirements and the cost requirements are inputted to the host computer 10, the management apparatus 20, or the like, the management program (not shown) of the host computer 10 or the management apparatus 20 calculates response performance (ms), throughput (IOPS, MBPS), and bit cost from the input information and determines the type of medium optimal for the storage control process.

The user can designate the service level to determine the type of medium. For example, if the user selects "emphasize response performance", the program of the GUI determines that SSD or SAS is optimal as a medium used by the virtual volume. At this point, the LANEs that use the SSD and the SAS are defined. In another example, LANEs, to which pages are allocated only from the SSD, are defined as ultrahigh-performance LANEs for the virtual volumes particularly requiring high performance. Additionally, LANEs, to which pages of the SSD and the SAS are allocated, are defined as high-performance LANEs. LANEs, to which pages are allocated from the SSD, the SAS, and the SATA, are defined as LANEs allocated by default.

Although the performance requirements from the user are imported through the host computer 10 or the management apparatus 20, an interface for the input of performance requirements may be provided as in the pool creation. There is also a method in which the storage apparatus 30 recognizes the performance requirements of the application based on the instruction from the user, and the storage apparatus 30 defines the LANEs.

When the LANEs are determined as described above, the LANE definition program 3509 registers the determined LANE definition in the LANE management information table 3514 (FIG. 11) in the storage apparatus 30.

FIG. 11 shows an example of LANE definition of the storage apparatus 30 with a pool including media of three tiers (SSD, SAS, and SATA). The LANEs 0, 1, and 2 are LANEs, to which areas are allocated only from one medium. In the LANEs 3 and 4, there are LANEs in which specific areas among three tiers are not allocation targets.

<Details of Process of S1730>

Hereinafter, a definition (setting) process of virtual volume, a LANE setting (LANE information registration) process of virtual volume, and a pool selection process based on the LANE information of virtual volume in the process of S1730 will be described.

(i) Definition (Setting) Process of Virtual Volume

Usually, the configuration control program 3503 creates a virtual volume based on input information by a virtual volume creation command. The input information by the virtual volume creation command includes a virtual volume number, a pool number of the pool to be used for the virtual volume, a virtual capacity of virtual volume, and the like. The concept of the LANE can also be implemented to similarly set the virtual volume. A virtual volume is defined designating the virtual volume number, the pool number of the pool to be used for the virtual volume, the type of a medium to be used for the virtual volume and the virtual capacity of virtual volume as input information by the virtual volume creation command. The defined LANE number may be used instead of the type of the medium to be used for the virtual volume. The LANE is set to each virtual volume in accordance with the performance requirements of the virtual volume. Therefore, the pool number of the pool used for the virtual volume is not designated by the user, and there is a method in which the configuration control program 3503 selects the pool to be used for the virtual volume from the set LANE and reports the selection to the management apparatus 20.

The configuration control program 3503 may determine the LANEs to be used for each application of the host computer (server) 10 or for each group of volumes used by the application of the host computer (server) 10. In that case, the user instructs which LANE or performance requirement will be defined for which virtual volume among the plurality of virtual volumes used by the application. The instruction method is the same as the method described in the LANE definition. As described, in addition to the method of issuing an instruction for each number of virtual volume, the number of virtual volumes of each LANE may be designated, and the storage apparatus 30 or the management apparatus 20 may return the set result to the application.

For example, if the LANEs of FIG. 11 are defined, the virtual volumes can be set to any of the LANEs 0 to 5. The virtual volumes, for which the user requests high performance, are set to the LANE 0. If there is no designation of performance requirement, the virtual volume is set to the LANE 5 by default.

(ii) LANE Setting (LANE Information Registration) Process of Virtual Volume

The configuration control program 3503 then registers the defined LANE information in FIG. 13 for each virtual volume.

The LDEV management information of FIG. 13 is managed LANE by LANE. The management format is a list or a queue structure. If six types of LANEs are defined in FIG. 11, there are six queues.

If LANE is not set for virtual volumes, all Tiers can be used for the virtual volumes.

(iii) Pool Selection Process based on LANE Information of Virtual Volume

The configuration control program 3503 then selects pools (candidates) from the capacity or the LANE information set to the virtual volumes.

More specifically, the configuration control program 3503 sets pools with media in compliance with the conditions as candidates based on the capacity and the LANE information set to the virtual volumes and selects candidates with more free capacities (unallocated areas to virtual volumes) from the candidates. Another example of selection method includes a method of selecting pools with more storage areas of high-performance media.

For example, if the storage apparatus 30 has a configuration of FIG. 3, the configuration control program 3503 selects the storage apparatus 30 with a medium in compliance with the conditions, selects the pools in the selected storage apparatuses 30, and registers the pools. Examples of the selection standard of the storage apparatus 30 include: there are a multiplicity of unused LDEV numbers; and the processor operating ratio or the load of the hard disk is low. The deviation in the performances between the storage apparatuses 30 and the condition in which the performance cannot be used in the entire storage apparatuses 30 are prevented by taking the load information of resources into consideration. For example, in general, the process can be completed faster when 50 requests are dispersed to each of two storage apparatuses, compared to when one storage apparatus sequentially processes 100 requests. If the virtual volumes are associated with copy-related functions, the load of the function may also be considered.

In this way, the configuration control program 3503 determines the storage apparatus 30, to which the virtual volumes are provisioned, and the pool volumes. The configuration control program 3503 also registers the pool ID of the selected pool in FIG. 13 for each virtual volume.

<Read Process>

Figure 20:
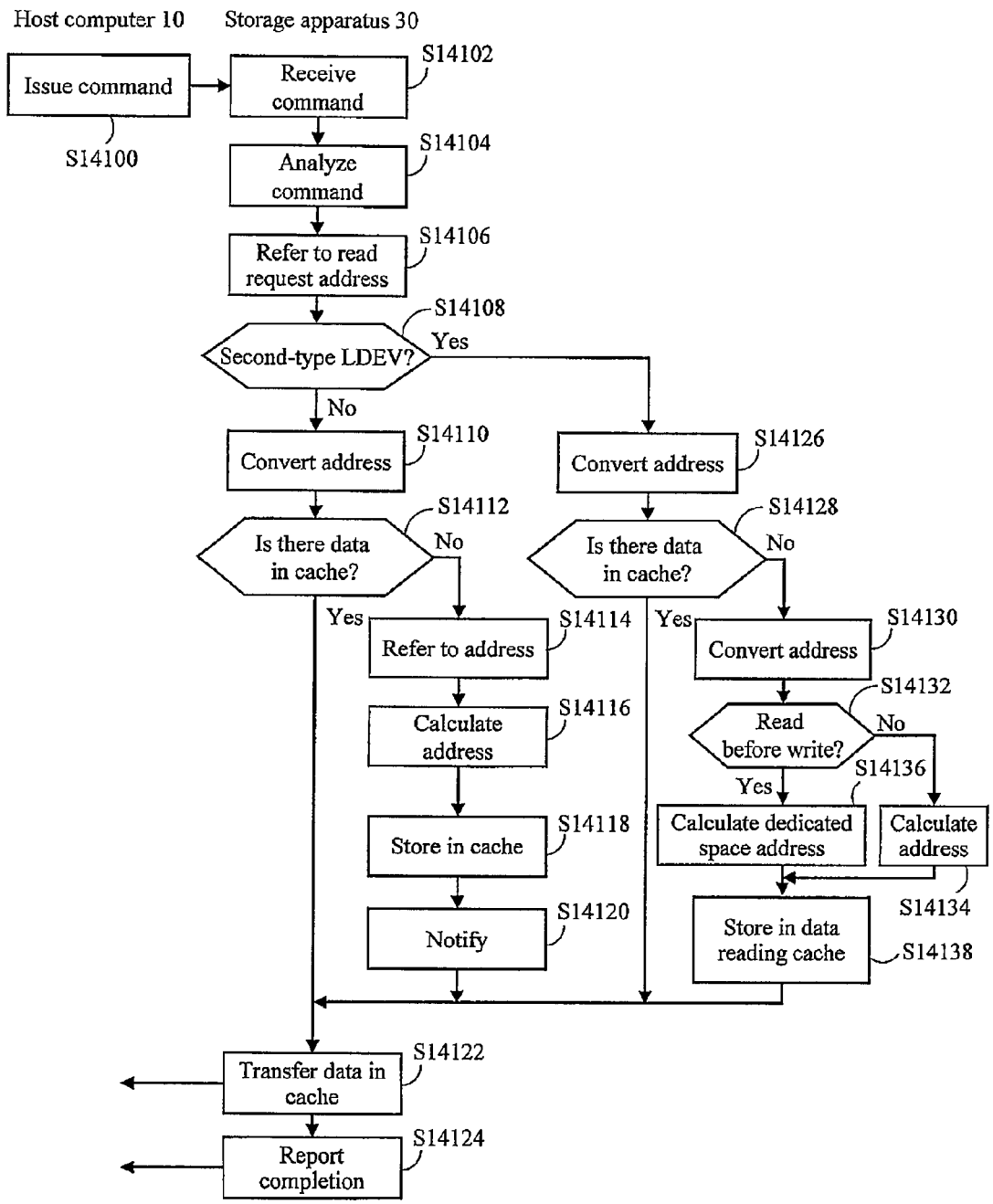
FIG. 20 is a flow chart for explaining a process (read process) when a read request is issued to a storage system.

FIG. 20 is a flow chart for explaining a read process. When the host computer 10 issues a command (S14100), the storage apparatus 30 receives the command (S14102).

The command control program 3501 of the storage apparatus 30 analyzes the received command (S14104) and refers to the address included in the read request (S14106).

The command control program S3501 determines whether the access target volume is the second-type LDEV (virtual volume) based on the referenced address (S214106). If the access target is the first-type LDEV (the substantive logical volume that is not a volume of thin provisioning (real volume)), the process moves to S14110. If the access target is the second-type LDEV (volume of thin provisioning), the process moves to S14126.

In S14110, the command control program 3501 performs LU-LDEV-VDEV address conversion (S14110) and determines whether the data of the read target address is in the cache memory (S14112).

If the data of the read target address is in the cache (Yes in S14112), the command control program 3501 transfers the data in the cache to the host computer (S14122) and reports the completion to the host computer (S14142).

If the data of the read target address is not in the cache (No in S14112), the command control program 3501 performs VDEV-PDEV/external LU address conversion (S14114), calculates the address of the medium storing the read target data (S14116), and activates a media access program (not shown).

The media access program reads out the data from the address of the calculated medium to store the data in the cache (S14118) and notifies the command control program 3501 of the storage in the cache (S14120).

When the notification from the media access program is received, the command control program 3501 transfers the data in the cache to the host computer 10 (S14122).

Meanwhile, if the read target address is an address of the virtual volume (second-type LDEV: volume of thin provisioning) (No in S14108), the command control program 3501 performs LU-LDEV-VDEV address conversion (S14126) and determines whether the data of the read target address is in the cache (S14128).

If the data of the read target address is in the cache (Yes in step S14128), the command control program 3501 transfers the data in the cache to the host computer 10 (S14122).

If the data of the read target address is not in the cache (No in S14128), the command control 3501 uses a virtual-pool address conversion function (S14130) to convert the address in a VDEV space of virtual volume to the address of a VDEV space of capacity-virtualized pool.

At this point, in the case of a data read request to an area where the data is not written before (Yes in S14132), the command control program 3501 calculates an address of a VDEV space (0 data area) for returning default values (for example, all "0") (S14136).

Otherwise (No in S14132), the command control program 3501 calculates the VDEV address of an area allocated for data writing to the virtual volume when the data is written for the first time or the VDEV address of an area, to which the data is moved from an area for the data writing or the like to improve the load dispersion or use efficiency of the pools or to recover the failure (S14134).

The command control program 3501 further performs the VDEV-PDEV/external LU address conversion to calculate the address of the medium storing the read target data (S14136).

The command control program 3501 then reads out the data from the calculated address of the medium and stores the data in a cache memory secured for the address of the space of the virtual volume (S14138).

<Write Process>

Figure 21:
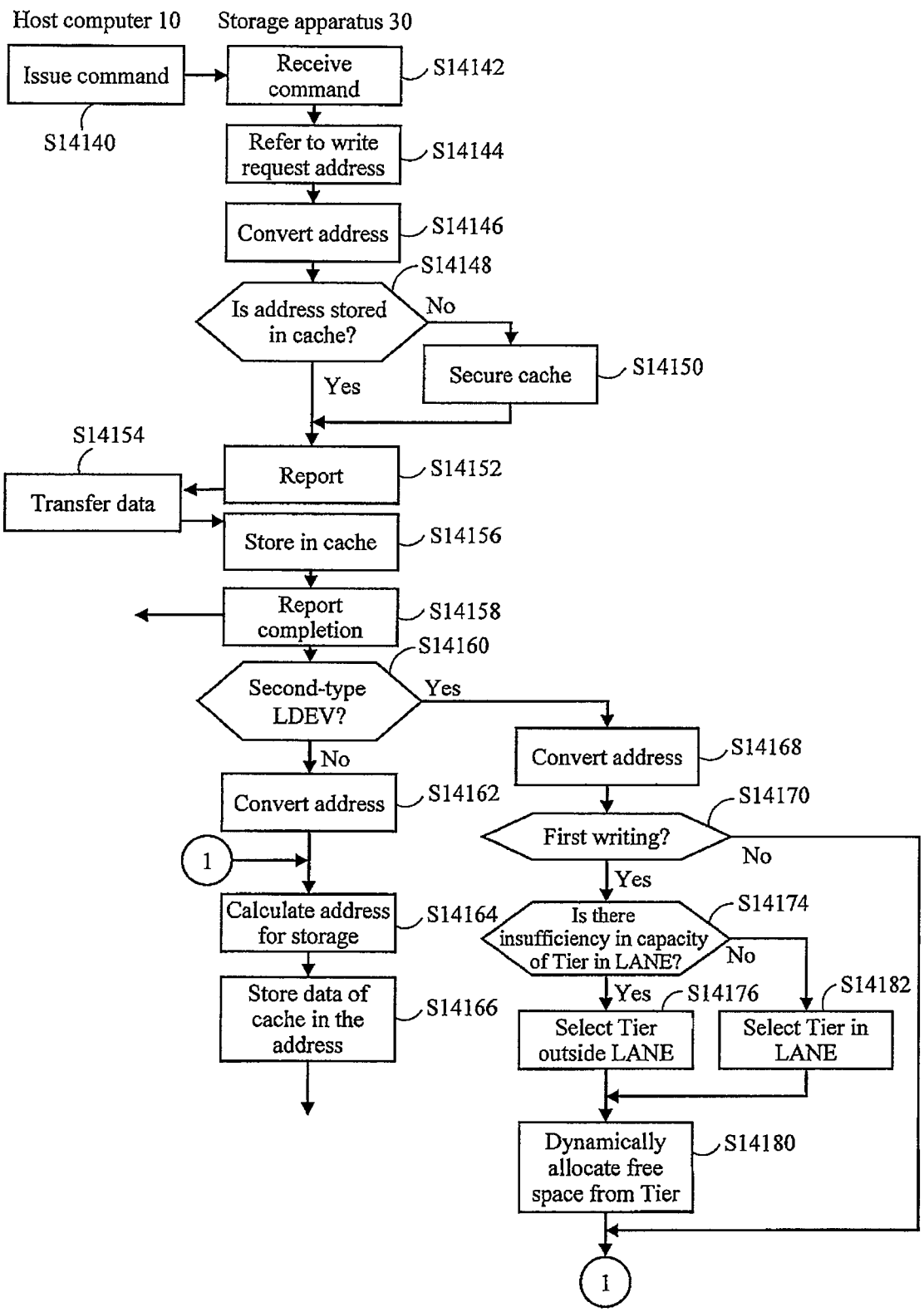
FIG. 21 is a flow chart for explaining a process (write process) when a write request is issued to the storage system.

FIG. 21 is a flow chart for explaining a write process. When the host computer 10 issues a write command (S14140), and the storage apparatus 30 receives the write command (S14142), the command control program 3501 refers to the address of the write request (S14144).

The command control program 3501 performs the LU-LDEV-VDEV address conversion regardless of whether the address is an address of a real volume (first-type LDEV) or an address of a virtual volume (second-type LDEV) (S14146) and determines whether the write target address is secured in the cache memory (S14148).

If the cache memory is not secured for the write target address (No in S14148), the command control program 3501 secures a cache memory area for storing the data transferred from the host computer 10 (S14150).

The command control program 3501 then reports the readiness of the data reception to the host computer 10 (S14152).

When the transfer data is received from the host computer 10 (S14154), the command control program 3501 stores the data in the secured cache memory (S14156) and transmits a write completion report to the host apparatus 10 (S14158).

If the write request address is an address of the first-type LDEV (the real volume) (No in S14160), the command control program 3501 performs the VDEV-PDEV/external LU address conversion (S14162), calculates the address of the medium for storing the write target data (S14164), and writes the data stored in the cache memory in the media address (S14166).

Meanwhile, if the write request address indicates the virtual volume (second-type LDEV: volume of thin provisioning) (S14160), the command control program 3501 refers to the VVOL-DIR table based on a conversion function of virtual volume address to pool address and converts the address of the VDEV space of the virtual volume to the address of the VDEV space of the pool (S14168).

If the write request is a write request for an area in which the data is not written before (Yes in S14170), the command control program 3501 executes the following process to secure the storage area for storing the write data. If it is determined that the free capacity of the Tier in the LANE set to the virtual volume is greater than a predetermined value, in other words, if it is determined that there is enough free area (No in S14174), the command control program 3501 dynamically allocates the free area of the pool for storing the data corresponding to the address of the virtual volume from the selected Tier in the LANE (S14182 and S14180). The Tiers prioritized in the allocation order are Tiers with smaller Tier numbers based on the method of setting the tier management information table 3513.

If it is determined in S14174 that there is insufficiency in the capacity (Yes in S14174), the command control program 3501 temporarily allocates an area from a Tier outside the LANE (S14176 and S14180). This prevents a situation that the area cannot be allocated. To allow recognizing the number of the virtual volume allocated from the Tier outside the LANE, a table may be created to manage the virtual volume allocated from the Tier outside the LANE.

The address of pool dynamically allocated with the free area is calculated as an address of the VDEV space of the pool corresponding to the address of the VDEV space of the write target for the virtual volume.

The storage apparatus 30 may equalize the allocation of pages to the virtual volumes among a plurality of pool volumes belonging to the same tier in the pool. The equalization process is described in PCT/JP2009/058533. The present applicant incorporates all items described in PCT/JP2009/058533 into the specification.

<Change in LANE of Virtual Volume>

The application of the host computer 10 may change the requirements during operation. If an application that has requested high performance requires only medium-degree performance in the operation from a certain point, there is no need to aggressively store the data in high-performance media as before. Therefore, the high-performance media can be preferentially allocated to other virtual volumes placing more emphasis on the performance. In this case, the user uses an interface similar to the interface for instructing the performance requirements to instruct a change in the performance requirements of the target virtual volume or the specific LANE number that needs to be changed. In the case of the instruction of the performance requirements, the LANE is replaced by the performance requirements after the change (performed by the management apparatus 20 or the storage apparatus 30, which is the same logic as in the LANE setting), and the LANE number after the replacement is set to the virtual volume. Specifically, the queue is reconnected from the LANE number queue before the change to the LANE number queue after the change.

For example, in the case of the configuration of FIG. 3, the LANEs and the pools defined in other storage apparatuses 30 may be selected. In the case of the configuration of FIG. 4, the change in the control processor 143 that executes processing of the virtual volumes is also taken into consideration. For example, if there is a deviation in the operation ratios of the control processors 143A and 143B when the LANE of the virtual volume #0 is changed, a change to the LANE or the pool of the module 1251*b* is made to use the control processor 143B with lower operating ratio. If the virtual volume #0 is changed to the pool of the module 1251*b*, the entity of the virtual volume #0 is migrated from the module 1251*a* to the module 1251*b*.

In another variation, there is a method of changing the LANE based on the determination from the result of monitoring of the I/O frequency by the storage apparatus 30. In the monitoring by the storage apparatus 30, the frequency of using the data may be monitored, the frequency may be compared with a preset threshold every certain time, and the frequency may be determined to be dropped if the frequency is below the threshold. A section which checks the user before the actual LANE change may also be arranged. Further, the migration process which may be performed for changing the LANE is not counted as I/O to be monitored.

As a result, volumes corresponding to the performance requirements of the user can be created. In the system environment constituted by a plurality of storage apparatuses, media compliant with the performance requirements at the start of the operation of the application can be used to constitute the virtual volumes. The media necessary to constitute the virtual volumes change along with the change in the performance requirements in the application after the operation of the application. The setting of the virtual volumes can be changed so that the tiers allocated at the start of the operation of the application are used in the requested media in accordance with the new required performance. There is a method of automatically changing the requested performance in the storage apparatus 30 based on an instruction from the user or by the storage apparatus 30 monitoring the frequency of use of data. The user can select the data storage location in the tiers set to the virtual volumes without being conscious of the media, in other words, without changing the usability of the pool.

<Comparison with Conventional Tier Control>

In the conventional tier control techniques, the virtual volumes (LUs) made of one tier are not the target of the tier control, and the LUs as the target of the tier control always store data in a plurality of tiers. Therefore, as for the LUs made of one tier, the tier of LU is not considered, such as from which tier the LU is created.

On the other hand, in the present invention, a plurality of tiers are formed, and specific virtual volumes (LUs) secure the storage areas only in the pool areas of one tier based on the setting of LANE. Therefore, the tiers need to be considered. In the configuration of a plurality of storage apparatuses as in FIG. 3, the tiers need to be considered to move the data between the storage apparatuses. If the number of tiers is two, whether to perform the tier control is selected, such as the tier control is not performed when there is one tier, and the tier control is performed when there are two tiers. Furthermore, it is novel compared to the conventional tier control that the process of selecting the tier (Tier) as the target of the tier control is added when the number of tiers is three or more.

<Data Migration (Migration)>

To store the data of the virtual volumes, the storage areas are secured from the tiers of higher priority at the initial point. The priority is defined by, for example, at least one of the performance and the unit cost. The performance is, for example, the I/O speed of data or the response time (time length from the reception of command from the host to the return of response). The unit cost is the price required to store the data of the unit size (for example, so-called bit cost).

If the process of securing the storage areas is continued, the amount of data stored in the high-performance media increases, and the free area ultimately disappears. Therefore, the data is migrated. Specifically, the data can be stored by dispersing the data to another tier (different medium) in the LANE set to the virtual volume. More specifically, when the Tiers with high performance in the LANEs are prioritized and selected in the first data storage, the access frequency of each page is monitored after the data storage. Consequently, the data with actually high access frequency is stored in higher Tiers, and a process of rearranging the data with not high access frequency to Tiers with low performance, in other words, data migration, is executed.

Figure 22:
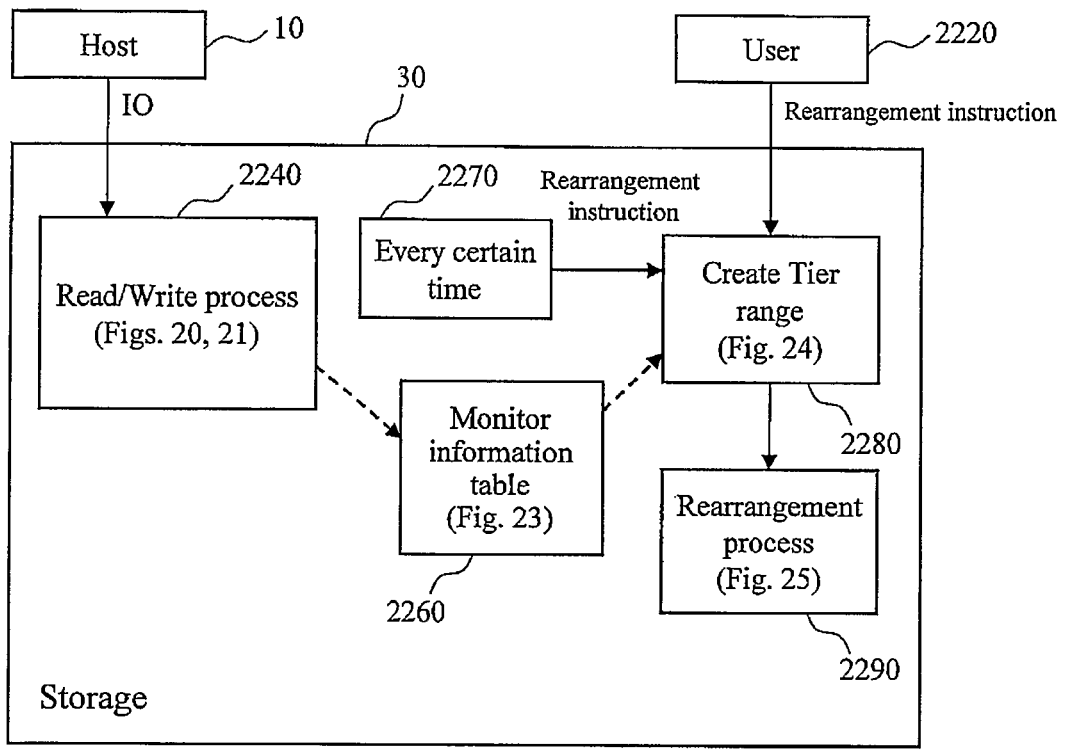
FIG. 22 is a diagram showing an overall summary of data migration.

FIG. 22 is a diagram showing an overall summary of the data migration. Usually, the read/write process (see FIGS. 20 and 21) is executed when I/O is issued from the host computer 10, and the access condition is registered in the monitor information table (see FIG. 23).

The migration process is activated by a migration instruction in the storage apparatus 30 every certain time (2270) or is activated by an instruction from the user (2220).

When the migration process is activated, the migration program 3510 determines a Tier range, which is a range of the load (for example, I/O frequency) of the real page that should exist in the target Tier (2280). The Tier range is determined by the capacity and the performance, and the Tier range is determined after referencing the monitor information of FIG. 23.

When the Tier range is created, the migration program 3510 carries out a migration process 2290 in accordance with the Tier range. For example, the migration program 3510 sequentially checks a plurality of virtual volumes one by one to determine whether the currently arranged Tier and the Tier that needs to be arranged coincide. If the Tiers do not coincide, the data is migrated and migrated. In the migration, it is desirable to first process the temporarily allocated virtual volumes (for example, virtual volumes temporarily allocated in S14176 and S14180 of FIG. 21).

<Monitor Information Table>

Figure 23:
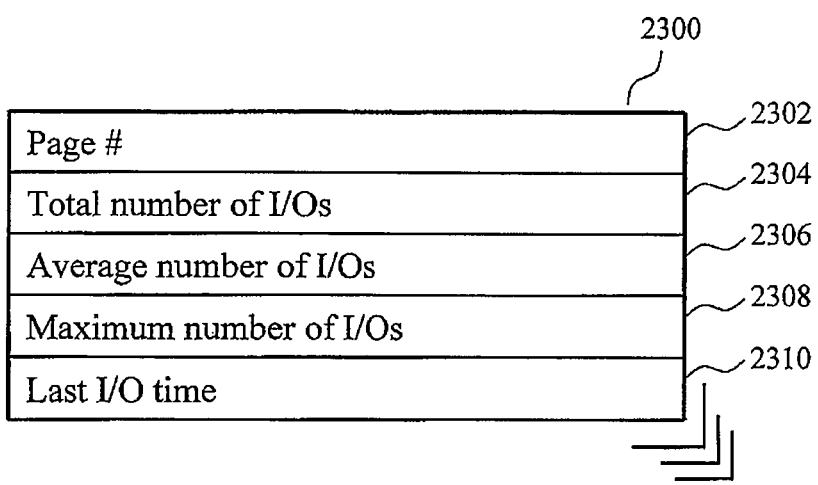
FIG. 23 is a diagram showing an example of configuration of a monitor information table.

FIG. 23 is a diagram showing an example of configuration of the monitor information table. The monitor information table is arranged for each virtual volume. Information of one page is shown in a configuration table 2300. The configuration table 2300 of the pages that can be stored in the capacity are connected to the virtual volume at the maximum.

Each configuration table 2300 of the monitor information table includes, as constituent items, a page number 2302, the total number of I/Os 2304, the average number of I/Os 2306, the maximum number of I/Os 2308, and last I/O time 2310.

The page number 2302 is information indicating the identifier of the page in the virtual volume. The total number of I/Os 2304 is information indicating the number of I/Os performed for the target virtual page in a monitor time zone. The average number of I/Os 2306 is a value calculated by dividing the value of the total number of I/Os 2304 by a predetermined time. The maximum number of I/Os 2308 is information indicating the largest number of I/Os among a plurality of numbers of I/Os (the numbers of I/Os in relation to the target virtual pages) in a plurality of time zones constituting the monitor time zone. The last I/O time 2310 is the latest time of the I/O to the target virtual page.

<Tier Range>

Figure 24:
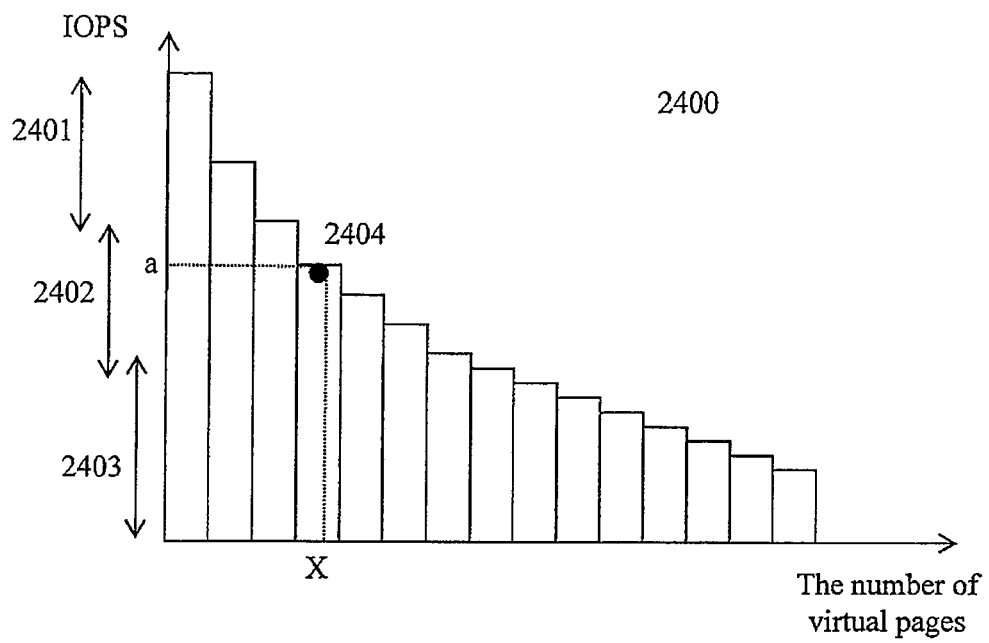
FIG. 24 is a diagram showing an example of a Tier range diagram.

FIG. 24 is a diagram showing an example of the Tier range. In FIG. 24, the horizontal axis denotes the number of pages, and the vertical axis denotes TOPS. For example, a range 2401 denotes the Tier 0, a range 2402 denotes the Tier 1, and a range 2403 denotes a range of the Tier 2.

FIG. 24 will be described with reference to a point (x, a) 2404 as an example. It can be recognized from the point that there are X pages in which the TOPS is a. Since the point is in the range 2402 of the Tier 1, the point indicates that the pages in which the IOPS is a need to be stored in the Tier 1. There are actually pages stored outside the Tier 1 among the pages in which the TOPS is a. The process of migrating the pages to the Tier 1 is the migration of the pages.

One Tier range diagram of FIG. 24 may be created in all, or the diagram may be created for each LANE.

Triggers of the migration process includes automatic execution of every preset certain time and manual execution by user instruction. The Tier range of FIG. 24 may be created every time an instruction is issued (2620 of FIG. 22) or every certain time (2670 of FIG. 22), or the Tier range diagram may be created by monitoring the threshold of the pool.

<Example that Tier in which Virtual Page is Currently Arranged and Tier in which Virtual Page Needs to be Arranged are Different>

Figure 25:
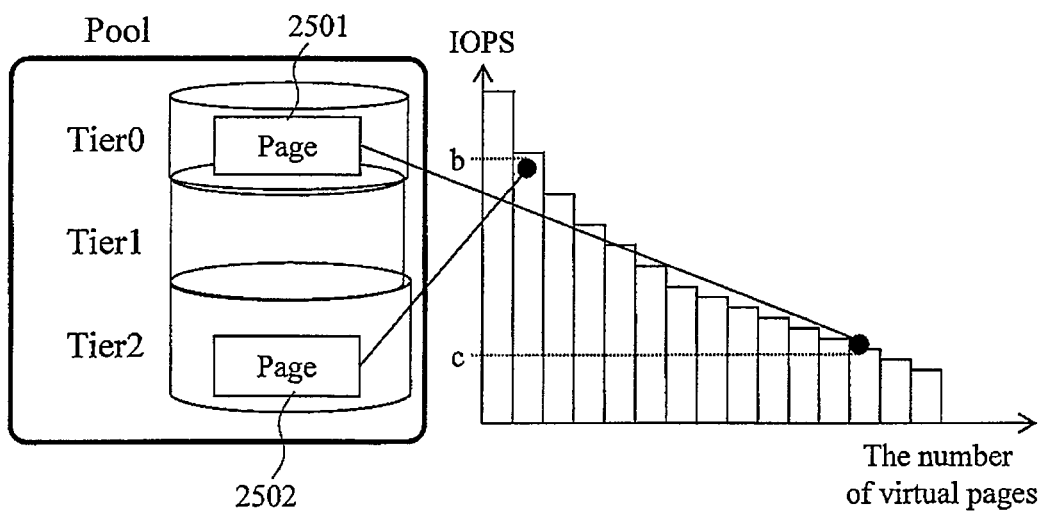
FIG. 25 is a diagram for explaining an example of process of determining the presence/absence of migration based on monitor information.

FIG. 25 is a diagram showing an example that the Tier in which the virtual page is currently arranged and the Tier in which the virtual page needs to be arranged are different. FIG. 25 shows pages, currently stored Tier numbers, and TOPS of pages.

Although a page 2501 is stored in the Tier 0, the access frequency (IOPS) is c, and the page 2501 falls into the range of the Tier 2. Therefore, the migration of the page 2501 from the Tier 0 to the Tier 2 compliant with the TOPS is carried out. A page 2502 is migrated from the Tier 2 to the Tier 0 in the same way.

<Migration Process>

Hereinafter, the migration process (migration process) will be described. An example in which the LANEs of FIG. 11 are defined will be described.

(i) Migration Method 1

As shown in FIG. 22, Tier range creation is activated by the migration instruction (2280). When a Tier range is created, the migration process (2290) is activated. The migration process is carried out from the LANE including the Tier 0 with high performance and is executed in the order of priority of securing areas from the Tier 0 among the LANEs. When the migration related to the Tier 0 is finished, the migration related to the Tier 1 is performed, and the remaining migration is performed lastly. The migration method 1 is characterized in that the Tier range diagram (FIG. 24) is first created, and the migration process is executed based on the Tier range diagram.

In the present embodiments, the LANEs are defined as in FIG. 11, and the specific execution order of the migration process is in the order of LANE #0, LANE #3, LANE #5, LANE #1, LANE #4, and LANE #2. Therefore, the LANEs with high-performance Tiers are preferentially processed.

(ii) Migration Method 2

A migration method 2 is characterized in that the migration process is first executed for the highest-performance LANE (for example, LANE #0), then the Tier range diagram (FIG. 24) is created, and the migration process is executed for other LANEs based on the Tier range diagram.

Figure 26:
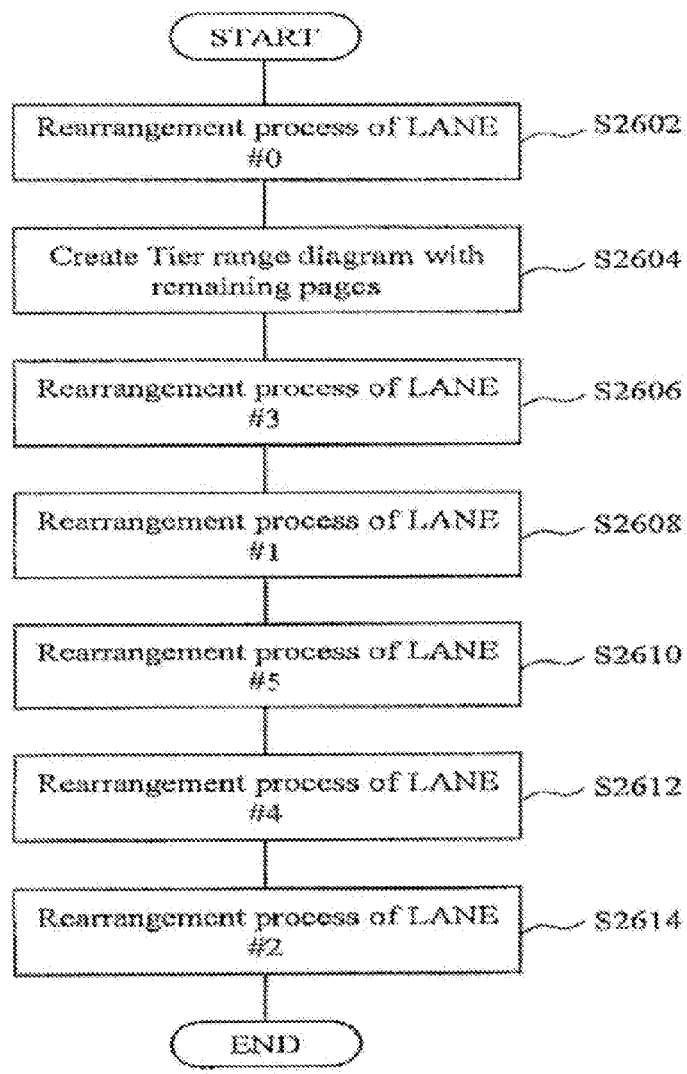
FIG. 26 is a flow chart for explaining a data migration process.

FIG. 26 is a flow chart for explaining another migration processing method. Although the flow chart of FIG. 26 is a process customized to the definition of FIG. 11, the fundamental concept is the same for any LANE definition. More specifically, the migration process is executed for the LANEs including only the highest-performance Tier that need to be preferentially processed, and then other LANEs including the highest-performance Tier are processed. If there are a plurality of LANEs including the highest-performance Tier, the order of the migration process is determined by the priority of Tiers excluding the highest-performance Tier.

Since the Tier 0 is high-performance among all included media, the migration program 3510 executes a migration process of storing the allocated page of the virtual volume set to the LANE #0 in the Tier 0 (S2602). Since the LDEV management information table 3512 of FIG. 13 exists for each LANE number as described, the process is executed for the LDEV management information of the LANE #0.

The migration program 3510 then obtains the Tier range of the capacity excluding the capacity of the Tier 0 used in S2602 (S2604).

The migration program 3510 then executes the migration process to the virtual volume set to the LANE #3 based on the obtained Tier range (S2606).

Similarly, the migration program 3510 executes the migration process to the virtual volumes set in the LANEs #1, #5, #4, and #2 (S2608 to S2614).

As a result of the process of FIG. 26, the virtual volume set to the LANE #0 formed by the highest Tier 0 is prioritized to allocate the area of the Tier 0. In the LANE #3, if the capacity of the Tier 0 is insufficient, it is requested to store all data in the Tier 1 to assure the state in which there is no area allocation from outside the LANEs. Furthermore, since the LANE #1 is made of only the Tier 1, it is requested to assure the allocation of the area of the Tier 1 to the virtual volume in which the LANE #1 is set. The requests are assured based on the processing order of FIG. 26.

In the LANE #5 and the LANE #4, the pages determined to be the Tier 1 may be put into the Tier 2 based on the Tier range. The information of the pages that cannot be migrated and that are stored in Tiers different from the Tiers determined to be desirable Tiers is stored in the tier number 35235 (see FIG. 16) in the target entry 35232 of the VVOL-DIR 3523.

If there is no defined LANE, the process of the LANE in FIG. 26 is skipped. For example, if the LANE #1 is not defined, S2608 is not executed, and the next process is executed.

<Details of S2602>

Figure 27:
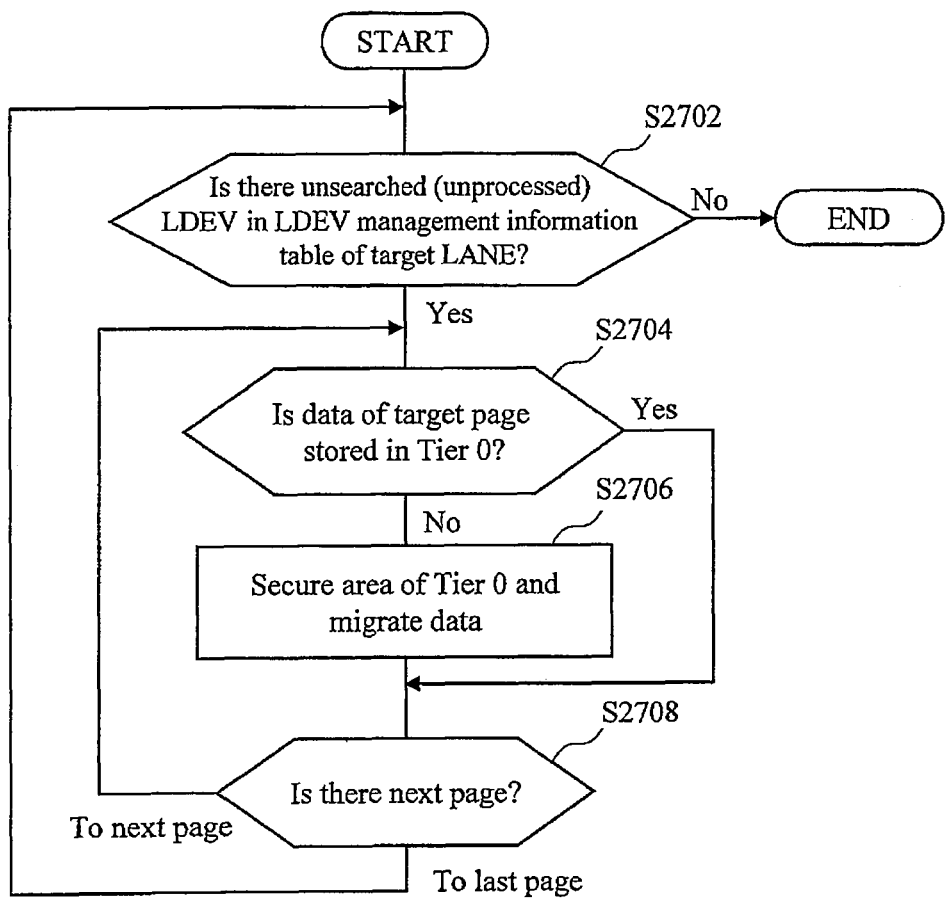
FIG. 27 is a flow chart for explaining the details of a migration process (S2602) of a highest-performance LANE (for example, LANE #0) constituted by a highest-performance tier.

FIG. 27 is a flow chart for explaining the details of the process of S2602. S2602 is a process of the virtual volumes (LDEVs) set to the LANE #0 constituted by the Tier 0, and the process is executed using the LDEV management information table 3512 of the LANE #0 among the LDEV management information tables 3512 of FIG. 13. The LDEVs are sequentially selected one by one from the top of the LDEV management information table 3512, and whether the pages of the LDEVs are allocated from the Tier 0 is determined. If the pages are not allocated from the Tier 0, the data is migrated to the Tier 0. Hereinafter, the process will be described according to the flow chart of FIG. 27.

The migration program 3510 first determines whether there is a virtual volume (LDEV) as a target of S2704 and subsequent processes in the LDEV management information table 3512 of the processing target LANE (for example, LANE #0) (S2702). If all LDEVs as processing targets are processed, or if there is no LDEV as a processing target (No in S2702), the process of S2602 ends. If there is an LDEV as a processing target (Yes in S2702), the process moves to S2702.

Subsequently, the migration program 3510 determines whether the data of the pages included in the LDEV as a processing target is stored in the Tier 0 (S2704). If the data is stored in the Tier 0 (Yes in S2704), the process moves to step S2708. If the data is not stored in the Tier 0 (No in S2704), the process moves to S2706.

In S2706, the migration program 3510 secures an area for storing the data of the processing target pages in the Tier 0, and the data is migrated to the Tier 0 (S2706).

Subsequently, if there is data of a next page in the same LDEV, the process moves to S2704. The process of S2704 to S2706 is repeated, and if the page as the processing target is the last page in the LDEV, the process moves to S2702 (S2708).

In this way, the migration process of the LANE #0 (LANE constituted by the highest-performance Tier) is executed.

<Details S2606 to S2614>

Figure 28:
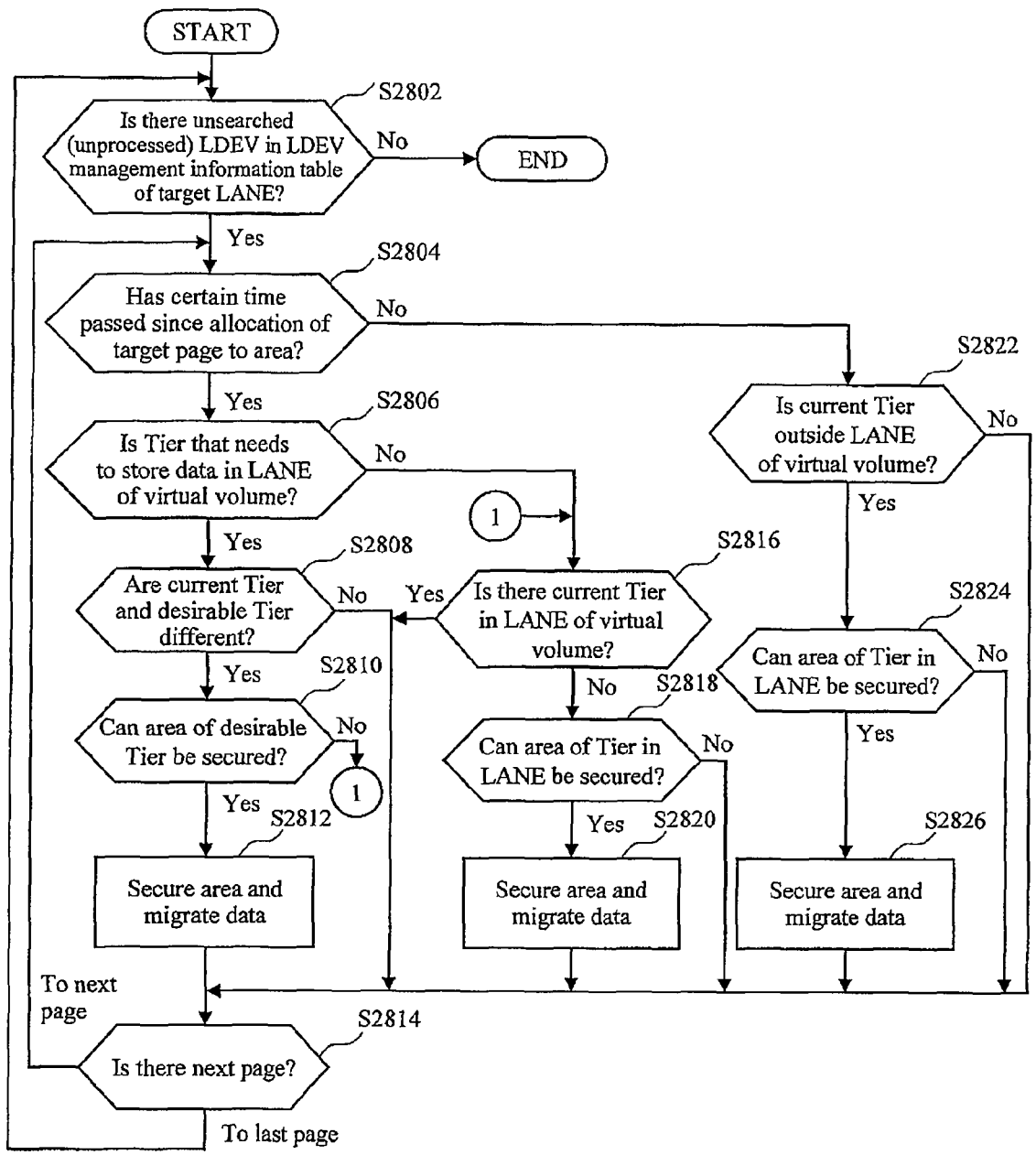
FIG. 28 is a flow chart for explaining the details of a migration process (S2606 to S2614) of other LANEs (for example, LANEs #1 to #5).

FIG. 28 is a flow chart for explaining the details of the process of S2606, S2608, S2610, S2612, and S2614. "LANE" in FIG. 28 denotes the LANE after the change if there is a change in the LANE storing the target page before the migration process. The process in the present embodiments is emphasized on sharing of the capacities of high-performance media between the LANEs. In another viewpoint, LANEs with stable performance may be prioritized and migrated in the definition of LANEs of FIG. 11. In that case, the migration process is executed in the order of LANE 0, LANE 1, LANE 2, LANE 3, LANE 4, and LANE 5. If the number of Tiers constituting the LANEs increases, the selections for allocating the pages (breadth of selection) increase. Therefore, the LANEs with fewer Tiers contribute to the performance stability.

The migration program 3510 first determines whether there is a virtual volume (LDEV) as a target of S2704 and subsequent processes in the LDEV management information tables 3512 of the processing target LANEs (for examples, LANEs #3, #5, #1, #4, and #2) (S2802). If there is no virtual volume, the process ends. The migration process is executed page by page.

If there is a virtual volume as a process target (Yes in S2802), the migration program 3510 determines whether a certain time has passed since the allocation of the target page of the virtual volume to the area (S2804). This is because the use frequency of the page can be considered low just after the allocation. If the certain time has passed (Yes in S2804), the process moves to S2806. If the certain time has not passed (No in S2804), the process moves to S2822.

In S2806, the migration program 3510 determines whether the Tier that needs to include the data of the target page is in the LANE of the virtual volume. This is because the data may be eventually arranged in the desirable Tier even if the data is allocated to a Tier outside the LANE. If the Tier is in the LANE of the virtual volume (Yes in S2806), the process moves to S2808. If the Tier is not in the LANE (No in S2806), the process moves to S2816.

In S2808, the migration program 3510 determines whether the current Tier including the target virtual page and the desirable Tier are different. Specifically, the Tier range diagram of FIG. 24 is used in the determination. If the current Tier and the desirable Tier are different (Yes in S2808), the process moves to S2810. If the current Tier and the desirable Tier are the same (No in S2808), the process moves to S2814. If there is a next page, the process from S2804 is repeated.

In S2810, the migration program 3510 determines whether an area for storing the target page can be secured in the desirable Tier (S2810). If the area can be secured (Yes in S2810), the process moves to S2812. If the area cannot be secured (No in S2810), the process moves to S2816.

In S2812, the migration program 3510 secures the area for storing the target virtual page in the desirable Tier and migrates the data. If there is a next page, the migration program 3510 repeats the process from S2804 (S2814).

If the current Tier and the desirable Tier are determined to be the same in S2808, the migration program 3510 determines whether the current Tier is in the LANE of the virtual volume (S2816). If the current Tier is in the LANE (Yes in S2816), the process moves to S2814. If there is a next page, the process from S2804 is repeated.

If the current Tier is not in the LANE (No in S2816), the migration program 3510 determines whether the area for storing the target page can be secured in the Tier in the LANE (S2818). If the area can be secured (Yes in S2818), the process moves to S2820. If the area cannot be secured (No in S2818), the process moves to S2814.

In S2818, the migration program 3510 secures the area for storing the target virtual page in the Tier in the LANE and migrates the data. If there is a next page, the migration program 3510 repeats the process from S2804 (S2814).

If it is determined in S2804 that the certain time has passed since the allocation of the target page of the virtual volume to the area, the migration program 3510 determines whether the current Tier is outside the LANE of the virtual volume (S2822). If the current Tier is outside the LANE of the virtual volume (Yes in S2822), the process moves to S2824. If the current Tier is in the LANE of the virtual volume (No in S2822), the process moves to S2814. If there is a next page, the process from S2804 is repeated.

In S2824, the migration program 3510 determines whether an area for storing the processing target page can be secured in the Tier in the LANE. If the area cannot be secured (No in S2824), the process moves to S2814. If there is a next page, the process from S2804 is repeated.

If it is determined in S2824 that the area for storing the processing target page can be secured in the Tier in the LANE, the migration program 3510 secures the area in the Tier in the LANE and migrates the data of the processing target page (S2826). If there is a next page, the migration program 3510 repeats the process from S2804 (S2814).

A combination without adjacent Tiers may be permitted as a variation of the definition of LANE. There is a LANE with a combination of SSD and SATA as shown in FIG. 12B. Such a LANE can also be set. The present embodiments can handle, for example, a virtual volume that is used in SATA most of the time and that needs to be partially used in SSD because data that requires performance arrives sporadically.

(iii) Migration Method 3

As described, the LANE set to the virtual volume may be changed. If the pages cannot be allocated due to lack of capacity in the Tier designated to the LANE, the pages may be temporarily allocated from another Tier exceptionally. This is equivalent to a case in which there is local capacity depletion, although the capacity of the entire pool is sufficient. In this case, the securing of the capacity is expected by the allocation of pages of another virtual volume or by the collection of 0 page. It is desirable not to add the capacity to the pool as much as possible, because the operation is cumbersome, and a load is imposed on the maintenance personnel.

In this way, efficient migration is possible by setting flags for a change in the LANE or for a temporary allocation from the Tier outside the LANE and by prioritizing the process when the migration process is activated. The migration process (migration process) may be activated at the timing of the setting of the flags.

<Details of S2602>

Figure 29:
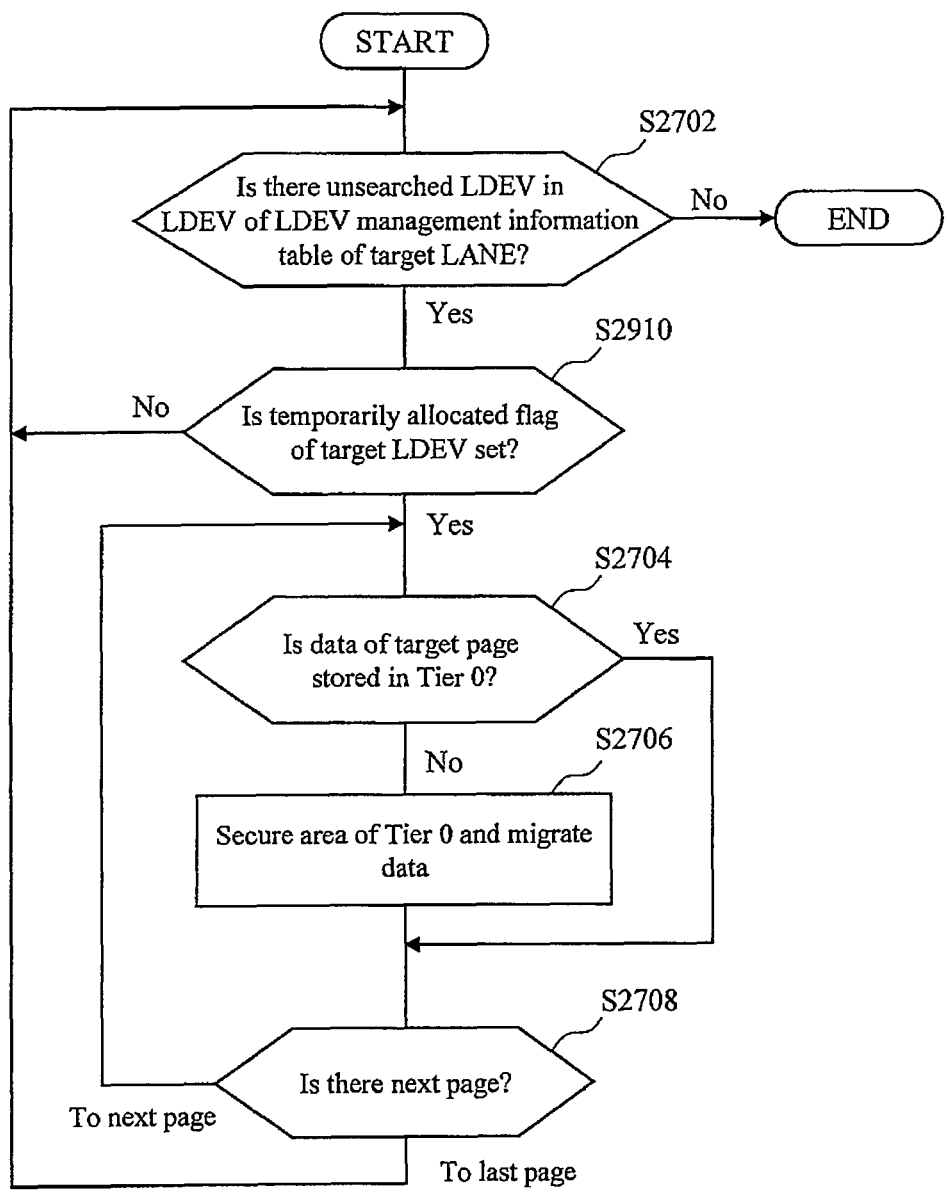
FIG. 29 is a flow chart for explaining a migration process of the highest-performance LANE in a migration method 3.

FIG. 29 is a flow chart for explaining the details of S2602 by a migration method 3. The difference from the migration method 2 (FIG. 27) is that a process of S2910 is executed between S2702 and S2704. More specifically, the migration program 3510 further determines whether there are temporarily allocated LDEVs (whether there are LDEVs with the flags) among the LDEVs, to which the process after S2710 is not applied, in the processing target LANE to further narrow down the processing target LDEVs (S2910). The process of S2704 to S2708 is executed for the narrowed down LDEVs.

<Details of S2606 to S2614>

The process of S2606 to S2614 in the migration method 3 is similar to that in the migration method 2 shown in FIG. 28. As in the case of the process of S2602, a process (not shown) of further narrowing down the processing targets by further determining whether there are temporarily allocated LDEVs among the LDEVs selected in S2802 is inserted between the processes of S2802 and S2804. Other processes are the same as in FIG. 28, and the description will not be repeated.

An attribution indicative of not performing the migration process can be attached to the page(s) in advance. In this case, even if the page with the attribute becomes a target page to be migrated from the current Tier to another Tier according to I/O frequency, the page is not migrated. Specifically, the attribute may be attached to the page by providing a flag for prohibiting the migration within PSCB management information 3524 for each page in FIG. 16. It is determined before migration whether the flag is on. If the flag is not on, the migration process is performed as described above. If the flag is on, the migration process is not performed. When it is determined that the migration process is not performed, it may be displayed on a screen of a display or informed to the management server that the migration process is not performed.

<Processing Priority of Target Virtual Volumes in Migration Process>

Possible method of the migration process include (a) a method of executing the process by prioritizing the virtual volumes, to which pages are temporarily allocated from outside the LANE range, and the virtual volumes including pages out of the LANE range due to a change in the LANEs set to the virtual volumes and (b) a method of executing the process by prioritizing the virtual volumes including pages out of the Tier range.

In the case of (a), if there is an unused Tier due to a change in the LANE, the data in the unused Tier is preferentially migrated. For example, in a change from SSD+SAS to SAS+ SATA, a process of moving SSD to SAS or SATA is executed first to quickly set a state suitable for the new LANE set in the virtual volume. In that case, the LANE after the change is selected based on a policy shown in FIG. 30.

The case of (b) is equivalent to the process of FIG. 28. The migration location is selected within the range of the LANE allocated to the virtual volume, and if the Tier of the movement destination determined from the Tier range is out of the LANE range, the data is not moved. Alternatively, the data is moved to a Tier nearby.

Figure 30A:
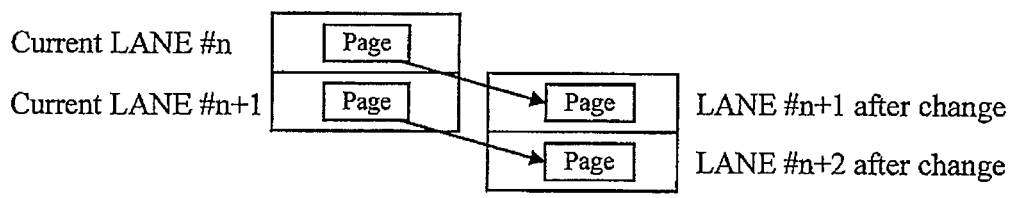
FIG. 30 is a diagram for explaining a specific example of migration.

FIG. 30A shows a basic policy of migration by selecting movement destinations for the LANEs after change in accordance with the Tier order of the LANEs before change. As shown in FIG. 30A, the basic operation of migration is that data is migrated from Tier #n to Tier #(n+1).

Figure 30B:
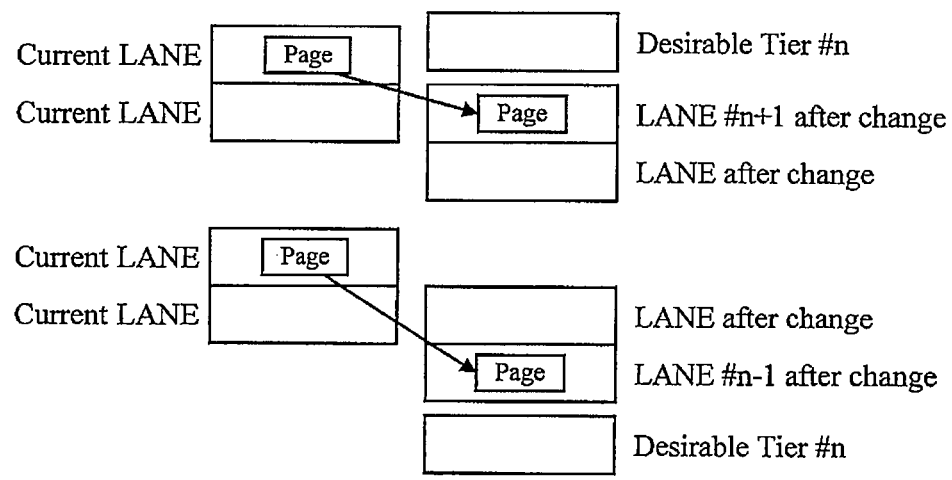

FIG. 30B shows a movement destination selection method when a Tier that needs to store data is obtained from the Tier range diagram at the time of the LANE change. Since the desirable Tier is not a Tier in the LANE after change, a Tier #(n−1) near the desirable Tier #n is selected from the LANE after change to migrate the data.

Figure 30C:
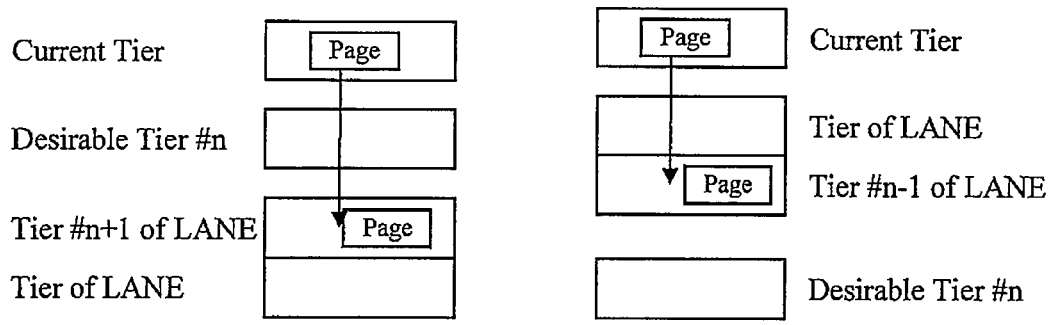

FIG. 30C shows a movement destination selection method when a Tier that needs to store data is obtained from the Tier range diagram in a situation in which the data is currently temporarily allocated to the Tier outside the LANE. As in the policy of FIG. 30B, a Tier in the LANE near the desirable Tier #n (for example, Tier #(n+1) or Tier #(n−1)) is selected to migrate the data.

An example of a method of selecting virtual volumes for the process of FIG. 28 includes a method of executing the process in the order of the numbers of the virtual volumes. The method is for starting the process from the virtual volume with the next number after the previous process if the migration process is activated again without the execution of the migration process up to the last virtual volume.

CONCLUSION

Virtual volumes and pool(s) are associated with each other. When the storage system receives a write request to a virtual volume from an upper level computer such as a host computer, the storage area(s) are retained in a pool associated with the virtual volume and target data of the write request is stored in the retained storage area(s). The pool is configured by combining several kinds of storage media each which has different performance from the others, such as an SSD, an SAS and an SATA. These media having different performances constitute a plurality of Tiers. The storage system sets up which Tier(s) should be used for the virtual volumes among the plurality of Tiers (media) in the pool, in advance. That is, it is determined from which Tiers the storage areas to store write data should be retained. Tiers to be used may be assigned to the virtual volumes by setting up LANE management information to assign LANE number. The performance requirements of the virtual volumes used by the application may also be designated to determine the LANEs according to the performance requirements. In this way, the pool is constituted by combinations of the tiers, instead of associating the pool and one tier (medium). Therefore, the breadth of allocation of the virtual volumes and the breadth of the usage of the storage system are wider, and the capacity of the media can also be efficiently used. As a result, the selection of a requested medium for allocating the storage area can be controlled for each virtual volume used by the application in accordance with the performance requirements of the application of the host computer. Furthermore, the host computer can select media in the pool in compliance with the performance requirements of the application to allocate the media to the virtual volumes without changing the single pool configuration, in other words, without changing the capacity efficiency and usability of the pool. When the performance requirements are changed, the media allocated to the virtual volumes can also be changed.

In the present embodiments, when a write request arrives from the host computer, the capacity in the tier including the address specified by the request may not include capacity enough to store the writing target page data. In such a case, a tier of a LANE different from the LANE specified from the address information is selected to write the target page data. The page data is migrated to an appropriate tier later. In this way, a situation that the storage area cannot be allocated to the target page during writing can be prevented.

Furthermore, access to the virtual volumes is monitored page by page to manage the access condition. The tier that needs to store the processing target page is specified based on the result of monitoring, and the data of the processing target page is migrated based on the tier storing the processing target, the tier that needs to store the processing target page, and the information of the LANEs to which the tiers belong.

More specifically, if the tier that needs to store the processing target page is a tier constituting the LANE to which the tier storing the processing target page belong and if the tier that needs to store the processing target page and the tier that stores the processing target page are different, whether the migration of the data of the processing target page to the tier that needs to store the data is possible is determined before migration. If the migration of the data of the processing target page to the tier that needs to store the data is not possible, it is preferable to migrate the data of the processing target page to the closest tier capable of migration among the tiers near the tier that needs to store the data. On the other hand, if the tier that needs to store the processing target page is not the tier constituting the target LANE to which the tier storing the processing target page belongs and if the tier storing the processing target page is not the tier constituting the target LANE, the processing target page is migrated to the storage area of the tier constituting the target LANE. In this way, the data can be stored in a medium with performance close to the performance of the tier (medium) that needs to store the data, and the request of the user can be more appropriately responded.

In the present storage system, a plurality of pools may be set, instead of the signal pool. In this case, for example, different LANE management information may be used for each pool. In addition, storage areas are assigned to virtual volumes within the range of Tiers by which pools are configured.

The present invention is not limited to the embodiments, and in the execution phase, the constituent elements can be modified without departing from the scope of the present invention to embody the present invention. Various inventions can be formed by appropriate combinations of a plurality of constituent elements disclosed in the embodiments. For example, some constituent elements may be deleted from among all constituent elements shown in the embodiments. Furthermore, constituent elements across different embodiments may be appropriately combined.

Part or all of the configurations, the functions, the processing units, the processing sections, and the like shown in the embodiments may be realized by hardware by, for example, designing the elements by integrated circuits. The configurations, the functions, and the like may be realized by software by a processor interpreting and executing programs for realizing the functions. The information of the programs, tables, files, and the like for realizing the functions and the like can be stored in a recording or storage device, such as a memory, a hard disk, and an SSD (Solid State Drive), or in a recording or storage medium, such as an IC card, an SD card, and a DVD.

Control lines and information lines considered necessary for the description are illustrated in the embodiments, and the control lines and the information lines in the product may not be entirely illustrated. All configurations may be connected to each other.

REFERENCE SIGNS LIST

10 host computer
20 management apparatus (management computer)
30 storage apparatus
351 configuration information
352 pool information
3501 command control program
3503 configuration control program
3505 disk I/O program
3507 pool control program
3508 pool volume management program of each tier
3509 LANE definition program
3510 migration program
3511 address management table
3512 LDEV management information table
3513 tier management information table
3514 LANE management information table
3515 media management information table
3521 pool management information table
3522 pool volume management information table
3527 pool tier management information table
3523 VVOL-DIR management information table
3524 PSCB management information table

The invention claimed is:

1. A storage system comprising:
a plurality of storage devices having different attributes whose storage areas are providing a pool, and,
a processer configured to provide at least two virtual volumes associated with the pool to a computer,
wherein pool areas in the pool constitute a plurality of tiers each of which have the different attribute, and each of the plurality of virtual volumes is set to a lane which is a combination of at least one tier, and,
wherein the processor is configured to:
execute a reallocation of pool areas allocated to the virtual volume according to a rearrangement of data stored in the pool areas allocated to the virtual volumes;
for each tier, execute the following steps:
i) a step of rearranging the data stored in the tiers lower than the target tier of the virtual volumes, whose lowest tier in the lane is the target tier, to pool areas in the target tier; and
then, ii) a step of rearranging the data, having an access frequency in a range set for the target tier, of other virtual volumes whose lane includes the target tier, to the pool area in the target tier.

2. A storage system according to claim 1, wherein the combination of at least one tier set for each of at least two of the plurality of virtual volumes is a different combination of the tiers.

3. A storage system according to claim 1, wherein the range is a consecutive range of the access frequency.

4. A storage system according to claim 1, wherein the processor is configured to rearrange the stored data among the plurality of tiers, if the pool in which the data is stored indicates the presence of the rearrangement.

5. A storage system according to claim 1, wherein the processor is configured to, if the pool area in the tier, which is the lowest tier among the lane set for the virtual volume to be allocated to the virtual volumes, is not enough, collect the pool areas, which is in the target tier, allocated to other virtual volumes.

6. A storage system according to claim 1, wherein the range is set based on a distribution of virtual pages in the pool according to their access frequencies.

7. A storage system according to claim 1, wherein at least one of virtual areas in the virtual volumes is set to prohibit a rearrangement of data, and the processor is configured not to rearrange the data stored in the at least one of virtual areas set to prohibit a rearrangement of the data.

8. A storage system according to claim 1, wherein the storage system comprises two or more storage apparatuses, each of the two or more storage apparatuses comprises the processor and at least one of the storage devices, and the pool is provided by the storage area of at least two of the two or more storage apparatuses.

9. A storage system according to claim 1, wherein the lane set for at least one of the virtual volumes includes only a part of the plurality of tiers.

10. A storage system comprising:
a plurality of storage devices having different attributes whose storage areas are providing a pool; and,
a processer configured to provide at least two virtual volumes associated with the pool to a computer,
wherein pool areas constitute a plurality of tiers including a first tier, and,
wherein the processor is configured to:
set a different combination of at least one tier to each of the virtual volumes;
reallocate a pool area in the first tier to first virtual volumes, to store write data stored in the tier lower than the first tier, to the first virtual volumes, wherein the lowest tier in the set tiers for the first virtual volume is the first tier;
reallocate pool areas in the first tier to virtual areas, in second virtual volumes whose set tier includes the first tier, to store write data stored in the pool area allocated to the virtual areas wherein an access frequency of the virtual areas are in a range for the first tier, and
execute the two reallocation operations for each of the plurality of tiers.

11. A method for operating a storage system having a plurality of storage devices having different attributes whose storage areas are providing a pool, and a processer configured to provide at least two virtual volumes associated with the pool to a computer, wherein pool areas in the pool constitute a plurality of tiers each of which have the different attribute, and each of the plurality of virtual volumes is set to a lane which is a combination of at least one tier, the method comprising:
executing, via the processor, a reallocation of pool areas allocated to the virtual volume according to a rearrangement of data stored in the pool areas allocated to the virtual volumes;
for each tier, execute the following steps:
i) rearranging, via the processor, the data stored in the tiers lower than the target tier of the virtual volumes, whose lowest tier in the lane is the target tier, to pool areas in the target tier; and
then, ii) a step of rearranging, via the processor, the data, having an access frequency in a range set for the target tier, of other virtual volumes, whose lane includes the target tier, to the pool area in the target tier.

12. A method according to claim 11, wherein the combination of at least one tier set for each of at least two of the plurality of virtual volumes is a different combination of the tiers.

13. A method according to claim 11, wherein the range is a consecutive range of the access frequency.

14. A method according to claim 11, wherein the processor rearranges the stored data among the plurality of tiers, if the pool in which the data is stored indicates the presence of the rearrangement.

15. A method according to claim 11, further comprising:
if the pool area in the tier, which is the lowest tier among the lane set for the virtual volume to be allocated to the virtual volumes, is not enough, collecting, via the processor, the pool areas, which is in the largest tier, allocated to other virtual volumes.

16. A storage system according to claim 11, wherein the range is set based on a distribution of virtual pages in the pool according to their access frequencies.

17. A method according. to claim 11, further comprising: setting at least one of virtual areas in the virtual volumes to prohibit a rearrangement of data, and not rearranging the data stored in the at least one of virtual areas set to prohibit a rearrangement of the data.

18. A method according to claim 11, wherein the storage system comprises two or more storage apparatuses, each of the two or more storage apparatuses comprises the processor and at least one of the storage devices, and the pool is provided by the storage area of at least two of the two or more storage apparatuses 19. A method according to claim 11, wherein the lane set for at least one of the virtual volumes includes only a part of the plurality of tiers.

* * * * *